(12) United States Patent
Knecht et al.

(10) Patent No.: US 11,969,937 B2
(45) Date of Patent: Apr. 30, 2024

(54) ADDITIVE MANUFACTURING APPARATUS, SYSTEM, AND METHOD

(71) Applicant: PAXIS LLC, Crystal Lake, IL (US)

(72) Inventors: Frederick Knecht, Woodstock, IL (US); Michael G. Littrell, Crystal Lake, IL (US)

(73) Assignee: PAXIS LLC, Crystal Lake, IL (US)

( * ) Notice: Subject to any disclaimer, the term of this patent is extended or adjusted under 35 U.S.C. 154(b) by 0 days.

(21) Appl. No.: 17/156,986

(22) Filed: Jan. 25, 2021

(65) Prior Publication Data

US 2021/0354364 A1 Nov. 18, 2021

Related U.S. Application Data

(63) Continuation of application No. 16/448,582, filed on Jun. 21, 2019, now Pat. No. 10,899,122, which is a
(Continued)

(51) Int. Cl.
*B33Y 30/00* (2015.01)
*B29C 64/106* (2017.01)
(Continued)

(52) U.S. Cl.
CPC .......... *B29C 64/129* (2017.08); *B29C 64/106* (2017.08); *B29C 64/20* (2017.08);
(Continued)

(58) Field of Classification Search
CPC ... B29C 64/218; B29C 64/236; B29C 64/245; B29C 64/277; B33Y 10/00
See application file for complete search history.

(56) References Cited

U.S. PATENT DOCUMENTS 4,865,029 A 9/1989 Pankratov et al.
4,915,402 A 4/1990 Brinker
(Continued)

FOREIGN PATENT DOCUMENTS

CN 101489766 A 7/2009
CN 101554778 A 10/2009
(Continued)

OTHER PUBLICATIONS

Jul. 19, 2022—(CN) Office Action—App 2022071402316160.
(Continued)

*Primary Examiner* — Russell E Sparks
(74) *Attorney, Agent, or Firm* — Banner & Witcoff, Ltd.

(57) ABSTRACT

An apparatus for producing a three-dimensional object includes a support assembly having a build platform, a track extending through a build area, and a deposition mechanism mounted on the track and configured for producing the three-dimensional object in a layer-by-layer technique. The deposition mechanism includes a carriage movable along the track, a supply of a flowable material mounted on the carriage, a roller in communication with the flowable material, where the roller is rotatably mounted on the carriage and configured for rotating to carry the flowable resin to an application for application to produce the object, and an exposure device mounted on the carriage. The exposure device emits electromagnetic waves to an exposure site to solidify the applied flowable material to produce the object. The roller is permeable to the electromagnetic waves, such that the waves pass through the roller in traveling from the exposure device to the exposure site.

23 Claims, 33 Drawing Sheets

Related U.S. Application Data continuation of application No. 15/349,748, filed on Nov. 11, 2016, now Pat. No. 10,343,390.

(60) Provisional application No. 62/255,175, filed on Nov. 13, 2015.

(51) Int. Cl.

| | | |
|---|---|---|
| *B29C 64/129* | (2017.01) | |
| *B29C 64/20* | (2017.01) | |
| *B29C 64/218* | (2017.01) | |
| *B29C 64/236* | (2017.01) | |
| *B29C 64/245* | (2017.01) | |
| *B29C 64/255* | (2017.01) | |
| *B29C 64/268* | (2017.01) | |
| *B29C 64/277* | (2017.01) | |
| *B33Y 10/00* | (2015.01) | |
| *B33Y 50/02* | (2015.01) | |
| B29C 64/264 | (2017.01) | |

(52) U.S. Cl.
CPC .......... *B29C 64/218* (2017.08); *B29C 64/236* (2017.08); *B29C 64/245* (2017.08); *B29C 64/255* (2017.08); *B29C 64/268* (2017.08); *B33Y 10/00* (2014.12); *B33Y 30/00* (2014.12); *B33Y 50/02* (2014.12); *B29C 64/264* (2017.08); *B29C 64/277* (2017.08)

(56) References Cited

U.S. PATENT DOCUMENTS

| | | | | |
|---|---|---|---|---|
| 5,248,456 A * | 9/1993 | Evans, Jr. | ............... | B33Y 40/20 |
| | | | | 118/712 |
| 5,263,130 A | 11/1993 | Pomerantz et al. | | |
| 5,902,537 A | 5/1999 | Almquist et al. | | |
| 6,207,097 B1 * | 3/2001 | Iverson | ................ | B29C 64/135 |
| | | | | 264/401 |
| 7,195,472 B2 | 3/2007 | John | | |
| 7,229,201 B2 | 6/2007 | Krupa et al. | | |
| 7,357,629 B2 | 4/2008 | Weiskopf et al. | | |
| 7,438,846 B2 | 10/2008 | John | | |
| 7,467,837 B2 | 12/2008 | Silverbrook | | |
| 7,806,493 B2 | 10/2010 | Gazeau et al. | | |
| 8,252,223 B2 | 8/2012 | Medina et al. | | |
| 8,317,508 B2 | 11/2012 | Bokodi et al. | | |
| 8,696,971 B2 | 4/2014 | Boot et al. | | |
| 9,011,136 B1 | 4/2015 | Uzan et al. | | |
| 9,254,535 B2 | 2/2016 | Buller et al. | | |
| 9,597,840 B2 | 3/2017 | Bradway et al. | | |
| 10,022,911 B2 | 7/2018 | Yasukochi | | |
| 10,343,390 B2 | 7/2019 | Knecht et al. | | |
| 10,618,270 B2 | 4/2020 | Knecht et al. | | |
| 10,703,085 B2 * | 7/2020 | Yasukochi | ............ | B29C 64/241 |
| 10,780,497 B2 | 9/2020 | Ng et al. | | |
| 10,792,868 B2 | 10/2020 | Ermoshkin et al. | | |
| 11,192,302 B2 | 12/2021 | Rademacher et al. | | |
| 2004/0233271 A1 | 11/2004 | Nojima et al. | | |
| 2005/0280185 A1 | 12/2005 | Russell et al. | | |
| 2008/0109102 A1 | 5/2008 | Sutcliffe | | |
| 2008/0169589 A1 | 7/2008 | Sperry et al. | | |
| 2009/0309267 A1 | 12/2009 | Boot et al. | | |
| 2010/0177151 A1 | 7/2010 | Thompson et al. | | |
| 2010/0191360 A1 * | 7/2010 | Napadensky | .......... | B33Y 80/00 |
| | | | | 700/98 |
| 2012/0045617 A1 | 2/2012 | Yasukochi | | |
| 2012/0313294 A1 | 12/2012 | Vermeer et al. | | |
| 2014/0070463 A1 | 3/2014 | Boot et al. | | |
| 2014/0268077 A1 | 9/2014 | Melde et al. | | |
| 2014/0271328 A1 | 9/2014 | Burris et al. | | |
| 2015/0016556 A1 | 1/2015 | Chen et al. | | |
| 2015/0084240 A1 | 3/2015 | Shuck et al. | | |
| 2015/0110910 A1 | 4/2015 | Hartmann et al. | | |
| 2015/0165556 A1 | 6/2015 | Jones et al. | | |
| 2015/0273762 A1 | 10/2015 | Okamoto | | |
| 2015/0360419 A1 | 12/2015 | Willis et al. | | |
| 2015/0375458 A1 | 12/2015 | Chen et al. | | |
| 2016/0158962 A1 | 6/2016 | Balistreri et al. | | |
| 2016/0236422 A1 | 8/2016 | Sakura | | |
| 2016/0311023 A1 | 10/2016 | Schirtzinger et al. | | |
| 2016/0311163 A1 | 10/2016 | Yasukochi | | |
| 2016/0311166 A1 | 10/2016 | Campbell | | |
| 2017/0015059 A1 | 1/2017 | Lewicki | | |
| 2017/0136688 A1 | 5/2017 | Knecht et al. | | |
| 2017/0136701 A1 | 5/2017 | Knecht et al. | | |
| 2017/0192377 A1 | 7/2017 | Batchelder et al. | | |
| 2017/0239885 A1 | 8/2017 | Knecht et al. | | |
| 2017/0239932 A1 | 8/2017 | Knecht et al. | | |
| 2017/0348902 A1 | 12/2017 | Ohara et al. | | |
| 2018/0141126 A1 | 5/2018 | Buller et al. | | |
| 2018/0141268 A1 * | 5/2018 | Holt | ...................... | G03F 7/029 |
| 2018/0253080 A1 | 9/2018 | Meess et al. | | |
| 2019/0022937 A1 | 1/2019 | Stelter et al. | | |
| 2019/0126347 A1 | 5/2019 | Roman et al. | | |
| 2019/0308371 A1 | 10/2019 | Knecht et al. | | |
| 2020/0298440 A1 | 9/2020 | Aoto et al. | | |
| 2021/0187829 A1 | 6/2021 | Ji | | |

FOREIGN PATENT DOCUMENTS

| | | | | |
|---|---|---|---|---|
| CN | 102049858 | A | 5/2011 | |
| CN | 103921444 | A | 7/2014 | |
| EP | 3085516 | A1 | 10/2016 | |
| EP | 3374163 | A1 | 9/2018 | |
| JP | S61118273 | A | 6/1986 | |
| JP | H05237942 | A | 9/1993 | |
| JP | H0768647 | A | 3/1995 | |
| JP | 2000211031 | A | 8/2000 | |
| JP | 2004122501 | A | 4/2004 | |
| JP | 2009543717 | A | 12/2009 | |
| JP | 2011098484 | A | 5/2011 | |
| JP | 2015120261 | A | 7/2015 | |
| KR | 20100080298 | A | 7/2010 | |
| RU | 2569516 | C2 | 11/2015 | |
| RU | 2610505 | C2 | 2/2017 | |
| RU | 2640551 | C1 | 1/2018 | |
| RU | 2642654 | C1 | 1/2018 | |
| WO | WO-9623647 | A2 * | 8/1996 | ............ B29C 41/12 |
| WO | 2012143786 | A1 | 10/2012 | |
| WO | 2014006399 | A1 | 1/2014 | |
| WO | 2014013312 | A1 | 1/2014 | |
| WO | 2015093032 | A1 | 6/2015 | |
| WO | 2015116639 | A1 | 8/2015 | |
| WO | 2015177598 | A1 | 11/2015 | |
| WO | 2016030405 | A1 | 3/2016 | |
| WO | 2016124432 | A1 | 8/2016 | |
| WO | 2017083734 | A1 | 5/2017 | |
| WO | 2018208799 | A1 | 11/2018 | |

OTHER PUBLICATIONS

Jul. 19, 2022 (CN) Office Action—English trans.
Mar. 24, 2017—(WO) International Search Report & Written Opinion—App PCT/US16/61649.
Sep. 12, 2018—(WO) International Search Report and Written Opinion—App PCT/US18/31630.
Mar. 19, 2019—(AU) Office Action—App 2016353326.
Apr. 2, 2019—(CA) Office Action—App 3,005,229.
Jul. 10, 2019—(EESR) Supplementary European Search Report & Opinion—App EP16865142.
Aug. 5, 2019—(WO) International Search Report & Written Opinion—App PCT/US19/26026.
Jul. 30, 2019—(JP) First Office Action—App 2018-544773.
Nov. 12, 2019—(CN) OA—App 2019110701451180—Eng Tran.
Nov. 26, 2019—(JP) Office Action—App 2014-174966—Eng Tran.
Jan. 1, 2020—(KR) OA—App 10-2018-7016314—Eng Tran.
Feb. 10, 2020—(EP) Office Action—App 16865142.0-1017.
Jan. 24, 2020—(CA) Office Action—App 3,005,229.
Mar. 11, 2020—(AU) Full Examination Report—App 2016353326.
Aug. 5, 2020—(CN) Office Action—App 2016800757907 (trans).

(56) References Cited

OTHER PUBLICATIONS

Sep. 22, 2020—(IN) Office Action—App 201817019642.
Sep. 24, 2020—(EP) Examination Report—App 16865142.0.
Mar. 26, 2021—(EP) Examination Report—App 16865142.0-1017.
May 19, 2021—(RU) Office Action—App 2020136323/05 (Eng Trans).
May 19, 2021—(RU) Search Report—App 2020136323 (Eng Trans).
Jun. 10, 2021 (SG) Examination Report—App 11202009858U (Eng).
Jul. 28, 2021—(AU) Examination Report No. 1—App 2019247458 (Eng Trans).
Nov. 8, 2021—(IL) Office Action—App No. 259305.
Jan. 3, 2022—(MX) First Office Action—App MX/a/2018/005954.

* cited by examiner

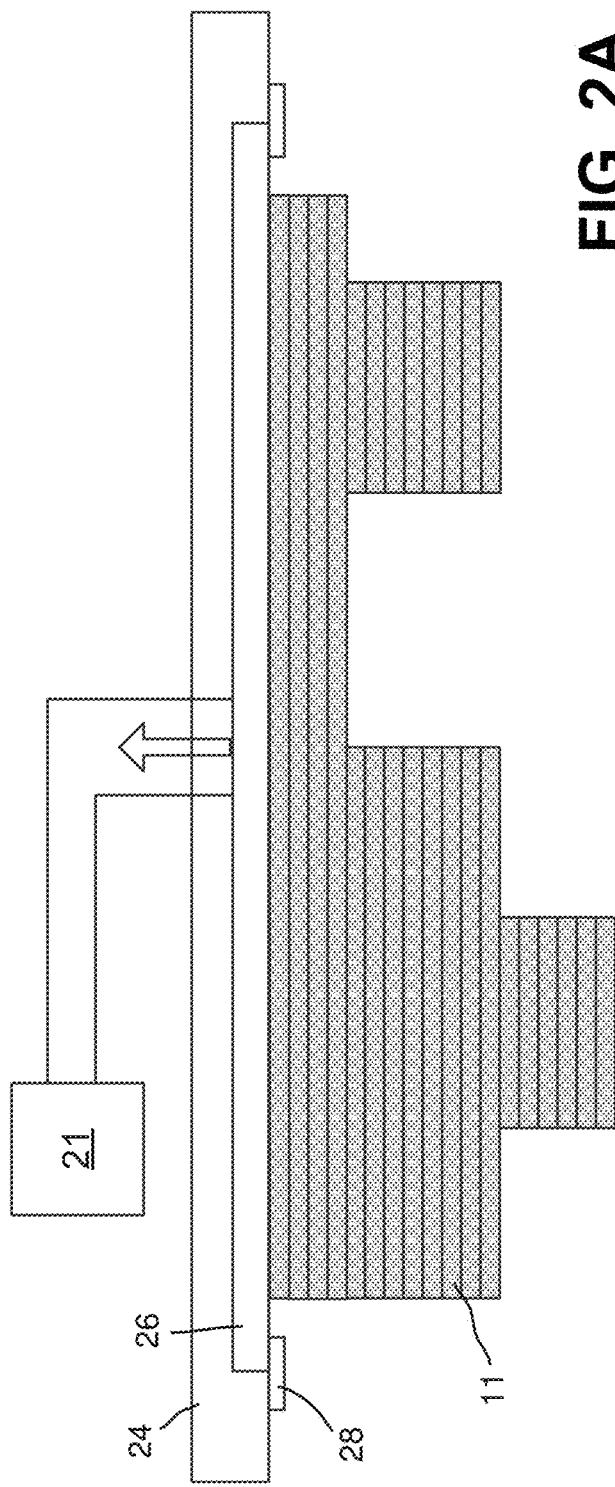

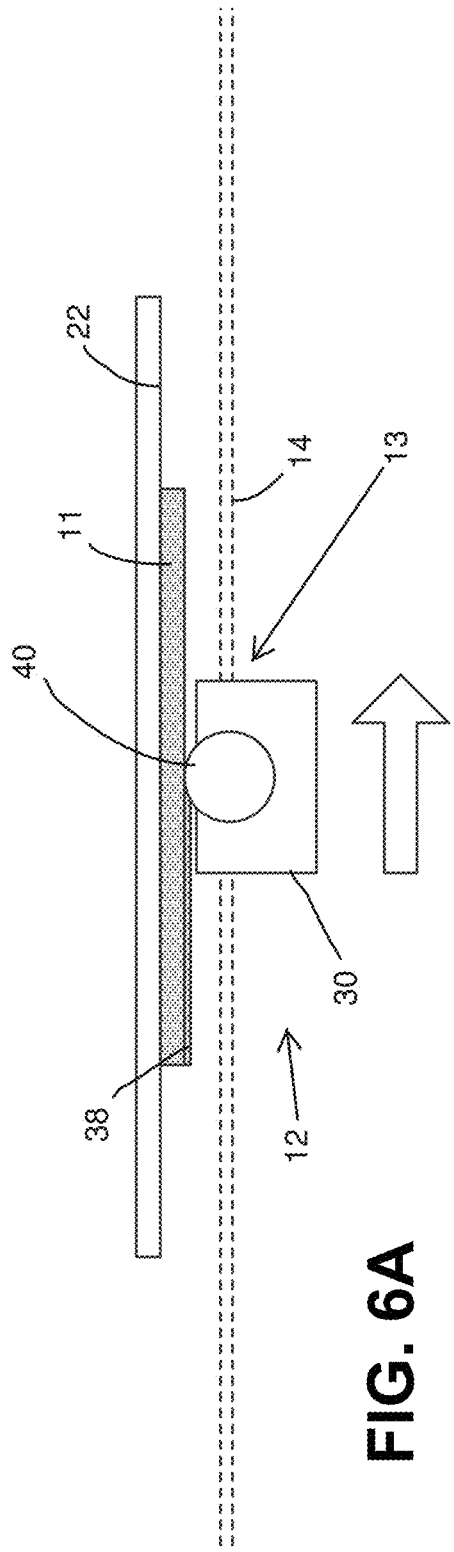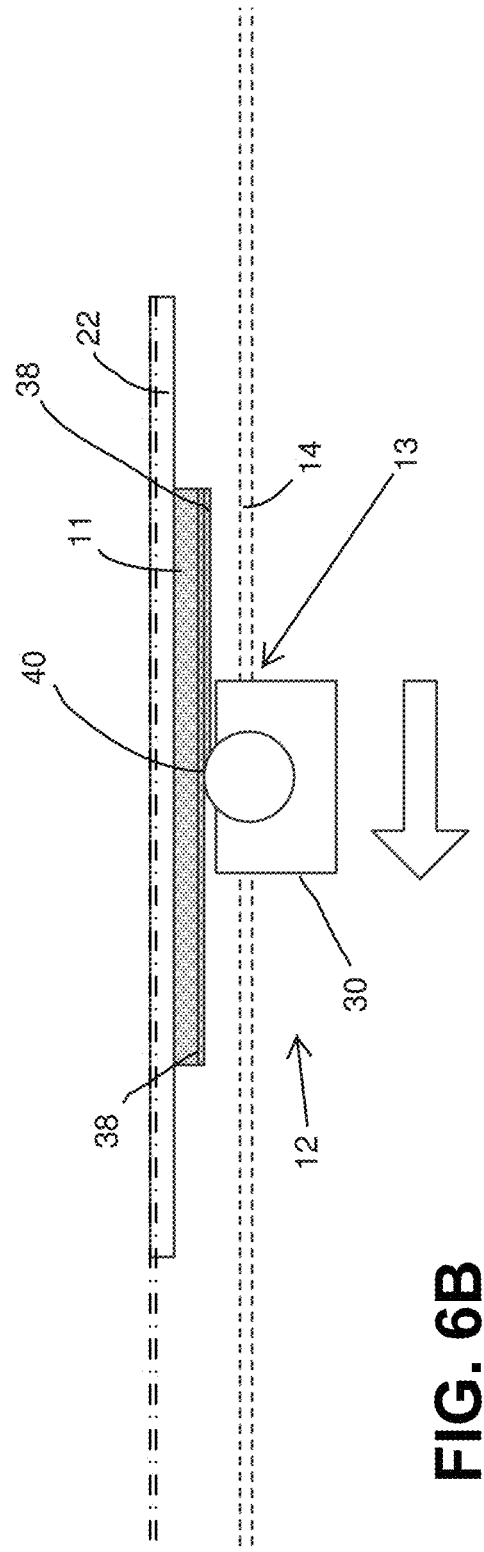

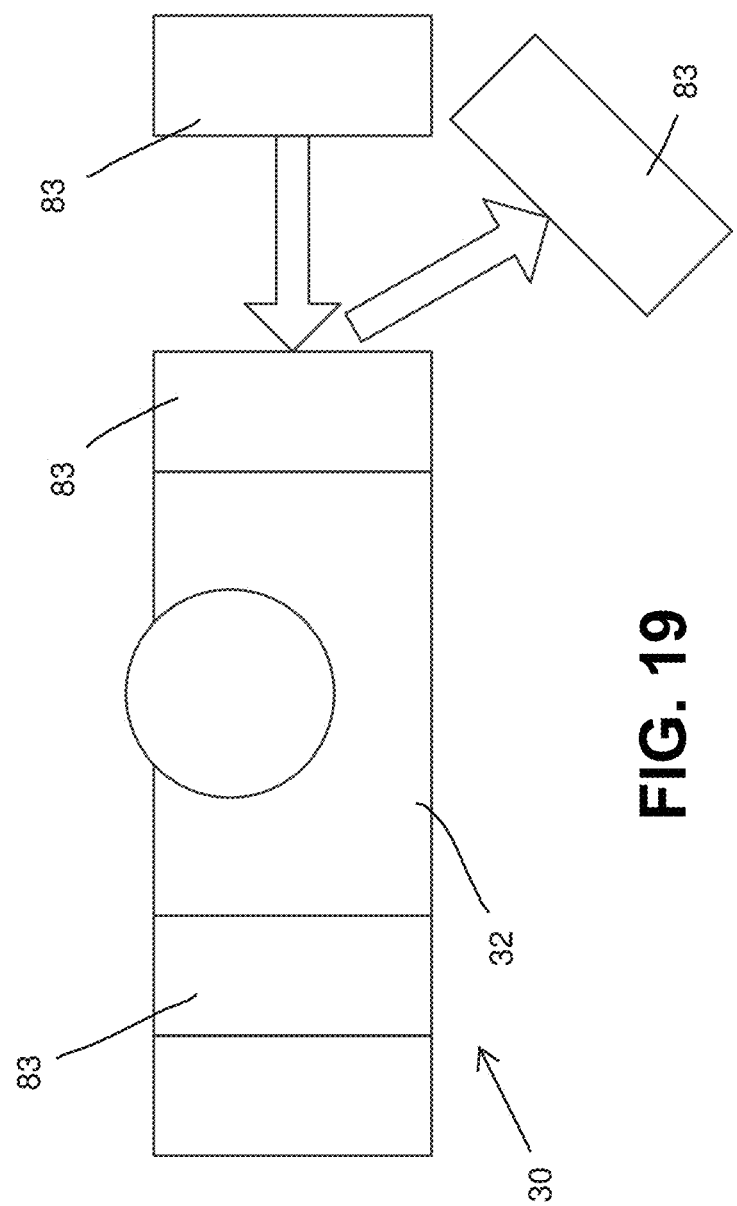

ADDITIVE MANUFACTURING APPARATUS, SYSTEM, AND METHOD

CROSS-REFERENCE TO RELATED APPLICATION

This application is a continuation of copending U.S. patent application Ser. No. 16/448,582, filed Jun. 21, 2019, which is a continuation of U.S. patent application Ser. No. 15/349,748, filed Nov. 11, 2016, issued as U.S. Pat. No. 10,343,390 on Jul. 9, 2019, which is a non-provisional of, and claims priority to, U.S. Provisional Application No. 62/255,175, filed Nov. 13, 2015, all of which prior applications are incorporated by reference herein in their entireties.

TECHNICAL FIELD

The present disclosure generally relates to an apparatus and system for producing a three-dimensional object in an additive manufacturing technique and method for operating the apparatus and system, and more specifically, to an apparatus, system, and method that uses a roller in contact with a flowable resin or other precursor material in building each layer of the object.

BACKGROUND

Current techniques for additive manufacturing of three-dimensional objects (e.g., stereolithography, 3-D printing, etc.) can produce excellent quality products with high fidelity, but such techniques have significant limitations. Typically, such techniques work in one of three ways: (a) continually polymerizing layers at or near the surface of liquid resin contained in a stationary vat, (b) continually polymerizing layers of resin at or near the bottom of a stationary vat of resin, or (c) continually polymerizing layers of resin that has been jetted downward by one or more single-nozzle or multi-nozzle print heads. Such techniques are generally limited to small sizes, with maximum sizes for various machines being only a few feet in width or length or even smaller. This limits the size of objects that can be produced. Jet-based processes have significant size limitations and waste a great deal of resin material during production.

Vat-based techniques require that the object is partially or fully submerged during manufacturing, thus requiring the vat of resin to be maintained at a significant volume. This can be costly, as such resins are typically very expensive, and maintenance of resin vats in a collection of machines can be extremely costly. The size of the vat also limits the size of the object that can be produced, as noted above. Additionally, submersion of the object during production often results in cavities within the object being filled with uncured liquid resin, which must be drained, often requiring drilling a drainage hole and subsequent repair. Further, the vat generally only contains a single resin, so manufacture of multi-material parts is not possible. Vat-based techniques have production speed limitations as well, due to wait times for new resin to flow over or under the areas to be polymerized.

The present disclosure seeks to overcome certain of these limitations and other drawbacks of existing apparatuses, systems, and methods, and to provide new features not heretofore available.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention and the disclosure in a general form as a prelude to the more detailed description provided below.

Aspects of the disclosure relate to an apparatus for producing a three-dimensional object, including a support assembly having a build platform with a build area defined below the build platform, a track extending through the build area, and a deposition mechanism mounted on the track and configured for producing a three-dimensional object on the build platform using a flowable resin in a layer-by-layer technique. The deposition mechanism includes a carriage engaged with the track and configured for movement along the track through the build area, a supply of a flowable resin mounted on the carriage, a roller in communication with the supply of flowable resin, where the roller is rotatably mounted on the carriage and configured for rotating to carry the flowable resin to an application site within the build area for application to produce the three-dimensional object as the carriage passes through the build area, and an exposure device mounted on the carriage. The exposure device is configured for emitting electromagnetic waves through an outlet toward an exposure site within the build area to solidify applied resin applied by the roller to produce the three-dimensional object. The roller is permeable to the electromagnetic waves and the outlet of the exposure device is positioned below the exposure site, such that the electromagnetic waves pass through the roller in traveling from the exposure device to the exposure site. The apparatus may be configured for deposition of non-resin materials as well.

Additional aspects of the disclosure relate to an apparatus for producing a three-dimensional object, including a support assembly having a build platform with a build area defined below the build platform, a track extending through the build area, and a deposition mechanism mounted on the track and configured for producing a three-dimensional object on the build platform using a flowable resin in a layer-by-layer technique. The deposition mechanism includes a carriage engaged with the track and configured for movement along the track through the build area, a supply of a flowable resin mounted on the carriage, a roller in communication with the supply of flowable resin, where the roller is rotatably mounted on the carriage and configured for rotating to carry the flowable resin to an application site within the build area for application to produce the three-dimensional object as the carriage passes through the build area, and an exposure device mounted on the carriage and configured for emitting electromagnetic waves. The deposition mechanism further includes a plurality of optical fibers having exit ends arranged in an array and entrance ends configured for receiving the electromagnetic waves from the exposure device, where the optical fibers are configured such that the electromagnetic waves emitted by the exposure device travel through the optical fibers and exit the exit ends of the optical fibers directed toward an exposure site within the build area to solidify applied resin applied by the roller to produce the three-dimensional object. The apparatus may be configured for deposition of non-resin materials as well.

Further aspects of the disclosure relate to an apparatus for producing a three-dimensional object, including a support assembly having a build platform with a build area defined below the build platform, a track extending through the build area, and a deposition mechanism mounted on the track and configured for producing a three-dimensional object on the build platform using a flowable resin in a layer-by-layer technique. The deposition mechanism includes a carriage engaged with the track and configured for movement along the track through the build area, a supply of a flowable resin mounted on the carriage, a roller in communication with the supply of flowable resin, where the roller is rotatably mounted on the carriage and configured for rotating to carry the flowable resin to an application site within the build area for application to produce the three-dimensional object as the carriage passes through the build area, and an exposure device mounted on the carriage and configured for emitting electromagnetic waves. The deposition mechanism further includes a lens positioned in a path of the electromagnetic waves, wherein the lens is configured to focus the electromagnetic waves toward an exposure site within the build area to solidify applied resin applied by the roller to produce the three-dimensional object. The apparatus may be configured for deposition of non-resin materials as well.

Still further aspects of the disclosure relate to an apparatus for producing a three-dimensional object, including a vat containing a flowable material, a build platform within the vat and located below a level of the flowable material, with a build area defined adjacent to the build platform, and a deposition mechanism configured for producing a three-dimensional object on the build platform by solidifying the flowable material in a layer-by-layer technique. The deposition mechanism includes a roller having a surface located beneath the level of the flowable material, and an exposure device configured for emitting electromagnetic waves through an outlet toward an exposure site within the build area to solidify flowable material located between the surface of the roller and the build platform to produce the three-dimensional object. The roller is permeable to the electromagnetic waves and the outlet of the exposure device is positioned above the exposure site, such that the electromagnetic waves pass through the roller in traveling from the outlet to the exposure site.

Still further aspects of the disclosure relate to an apparatus for producing a three-dimensional object, including a support assembly having a build platform with a build area defined adjacent to the build platform, and a deposition mechanism operably connected to the support assembly and configured for producing a three-dimensional object on the build platform using a flowable material in a layer-by-layer technique. The deposition mechanism includes a static surface defining an application site for application of the flowable material, and an applicator comprising a continuous film in communication with a supply of the flowable material and configured for moving over the static surface to carry the flowable material to the application site within the build area for application to produce the three-dimensional object. The deposition mechanism further includes an exposure device configured for emitting electromagnetic waves through an outlet toward an exposure site within the build area to solidify applied flowable material applied by the applicator to produce the three-dimensional object.

Other aspects of the disclosure relate to systems that include an apparatus as described above, with a computer controller configured for controlling one or more operations of the apparatus to produce the object.

Other aspects of the disclosure relate to methods of operating the systems and apparatuses described above, including selective activation of the exposure device to solidify the applied material as desired to produce the object.

Other features and advantages of the invention will be apparent from the following description taken in conjunction with the attached drawings.

BRIEF DESCRIPTION OF THE DRAWINGS

To understand the present invention, it will now be described by way of example, with reference to the accompanying drawings in which:

FIGS. 2A and 2B are side schematic views of a support assembly of the system and apparatus of FIG. 1, with a three-dimensional object produced on the support assembly;

FIGS. 6A and 6B are side schematic views of the system and apparatus of FIG. 1 in operation, according to aspects of the present disclosure;

FIG. 19 is a side schematic view of another embodiment of a deposition mechanism configured for modular connection of modular connection of components, according to aspects of the disclosure;

DETAILED DESCRIPTION

Figure 1:
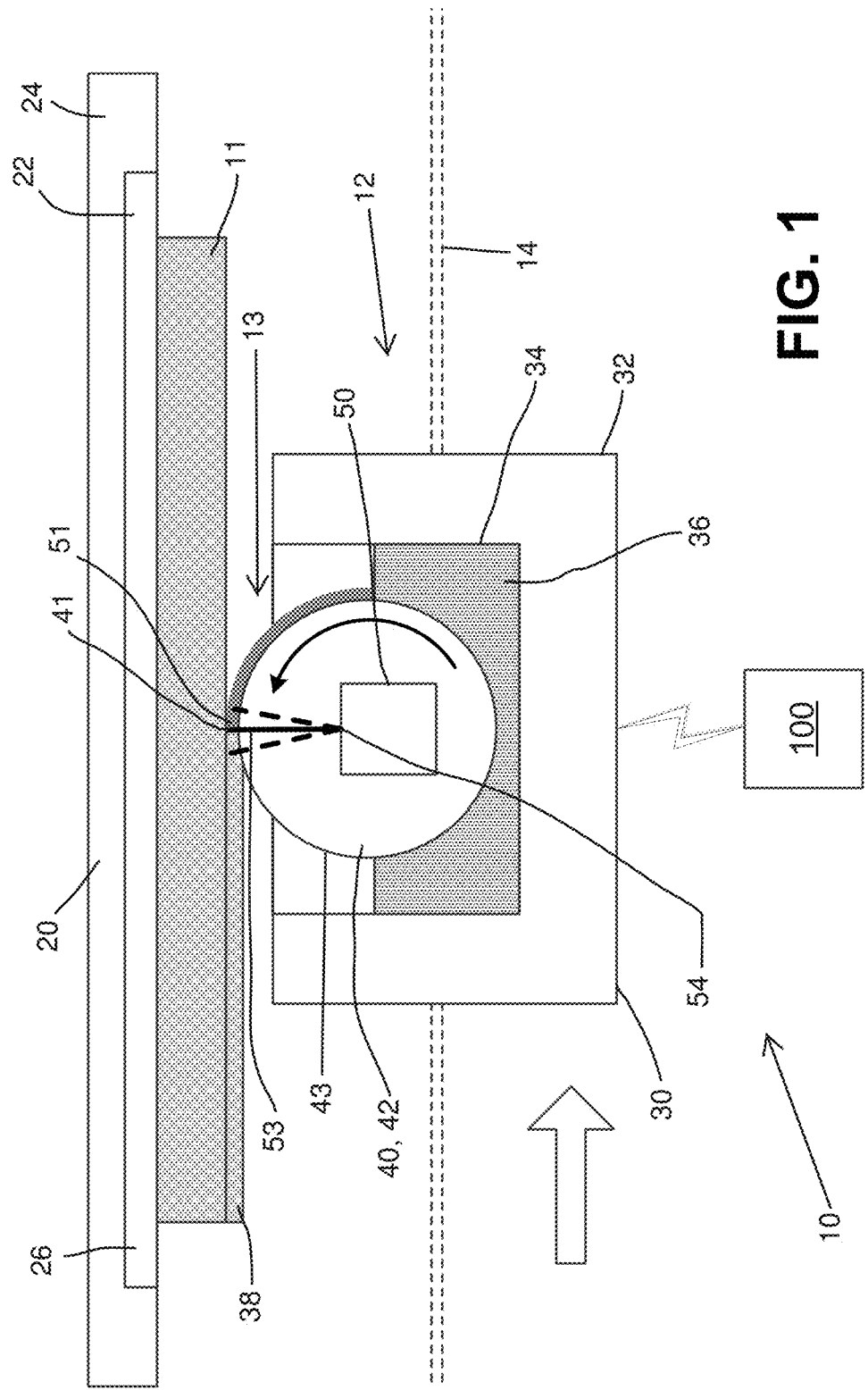
FIG. 1 is a side schematic view of one embodiment of a system and apparatus for producing a three-dimensional object in operation, according to aspects of the disclosure.

While this invention is capable of embodiment in many different forms, there are shown in the drawings, and will herein be described in detail, certain embodiments of the invention with the understanding that the present disclosure is to be considered as an example of the principles of the invention and is not intended to limit the broad aspects of the invention to the embodiments illustrated and described.

Figure 2B:
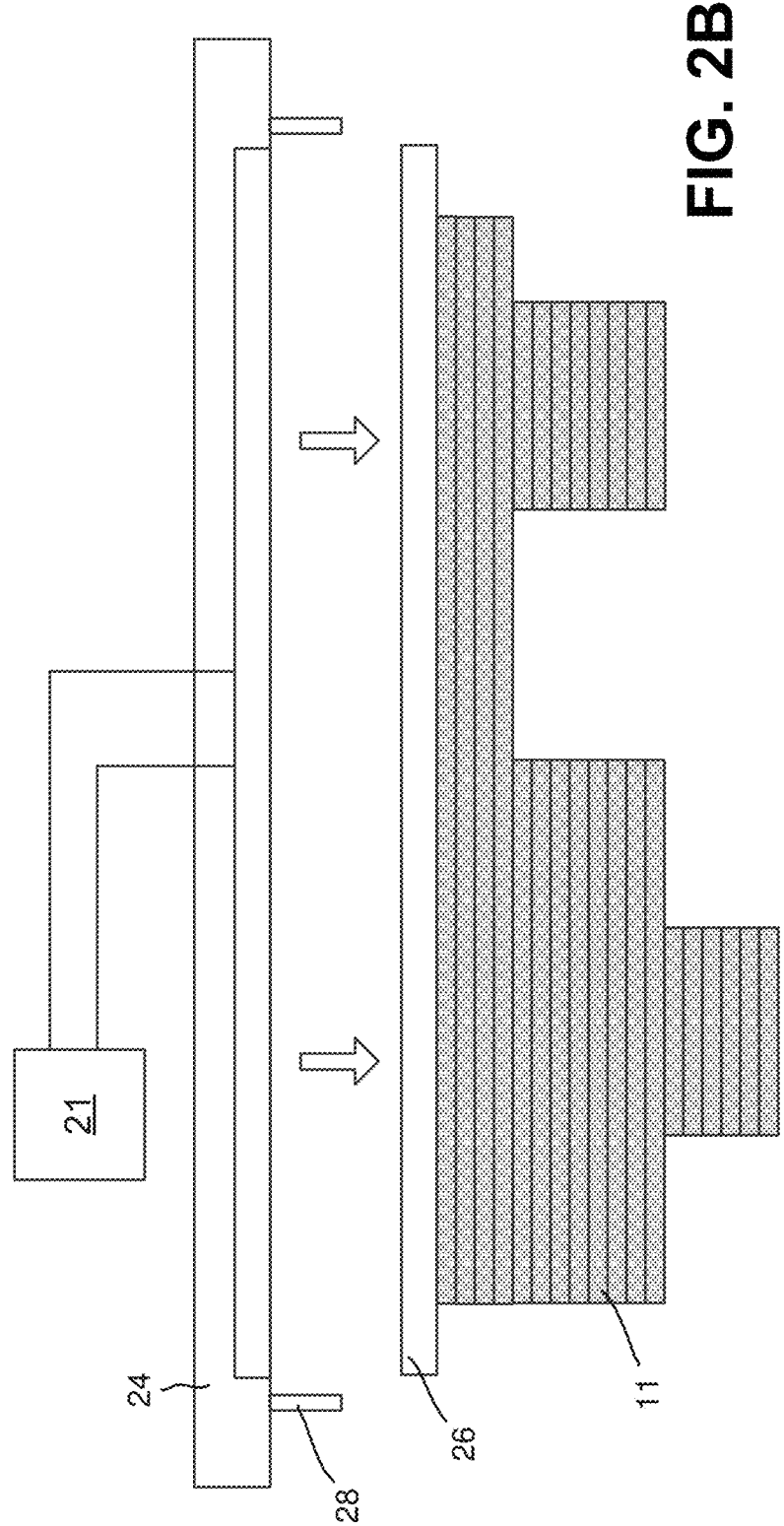
Figure 3:
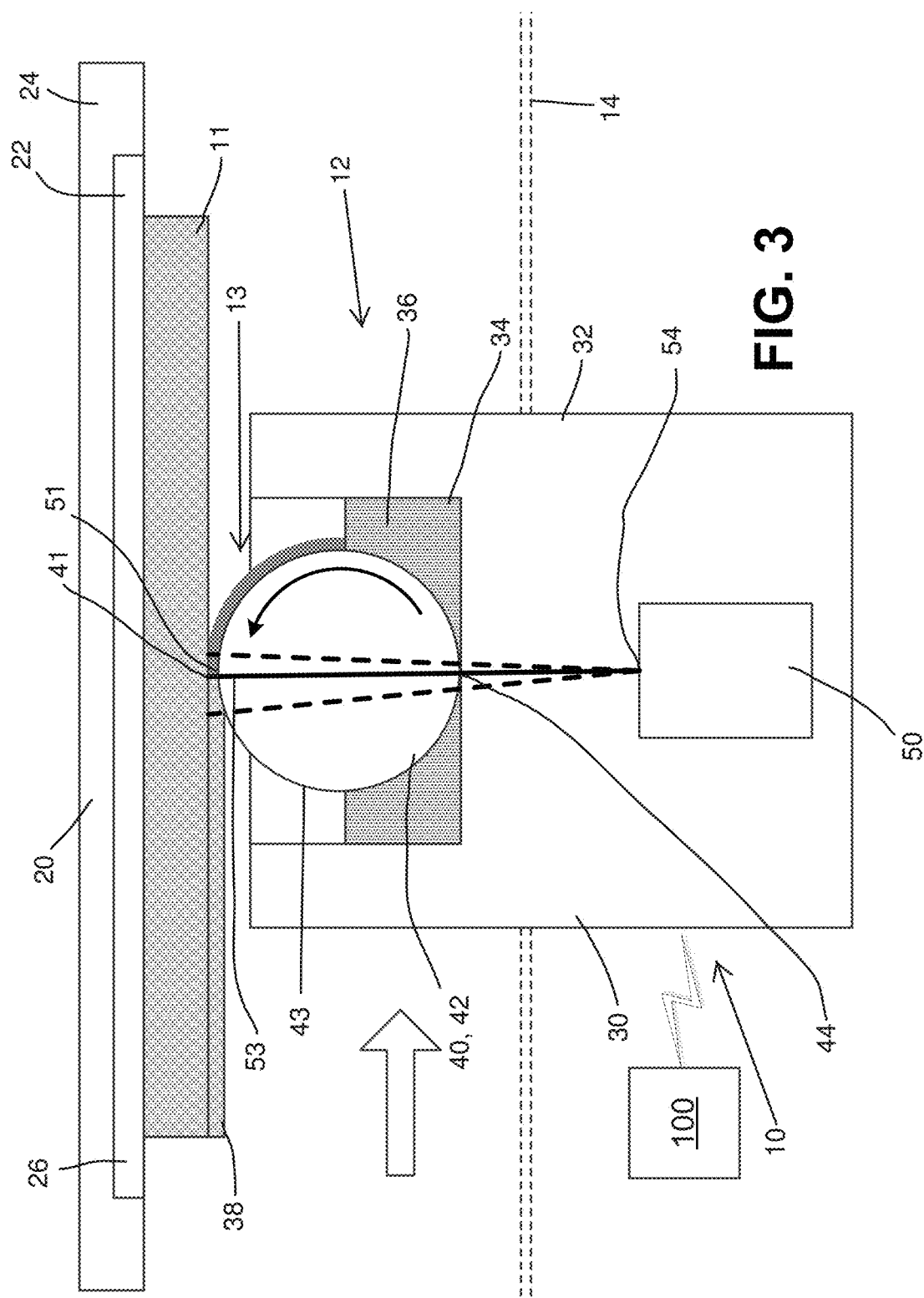
FIG. 3 is a side schematic view of another embodiment of a system and apparatus for producing a three-dimensional object in operation, according to aspects of the disclosure.
Figure 4:
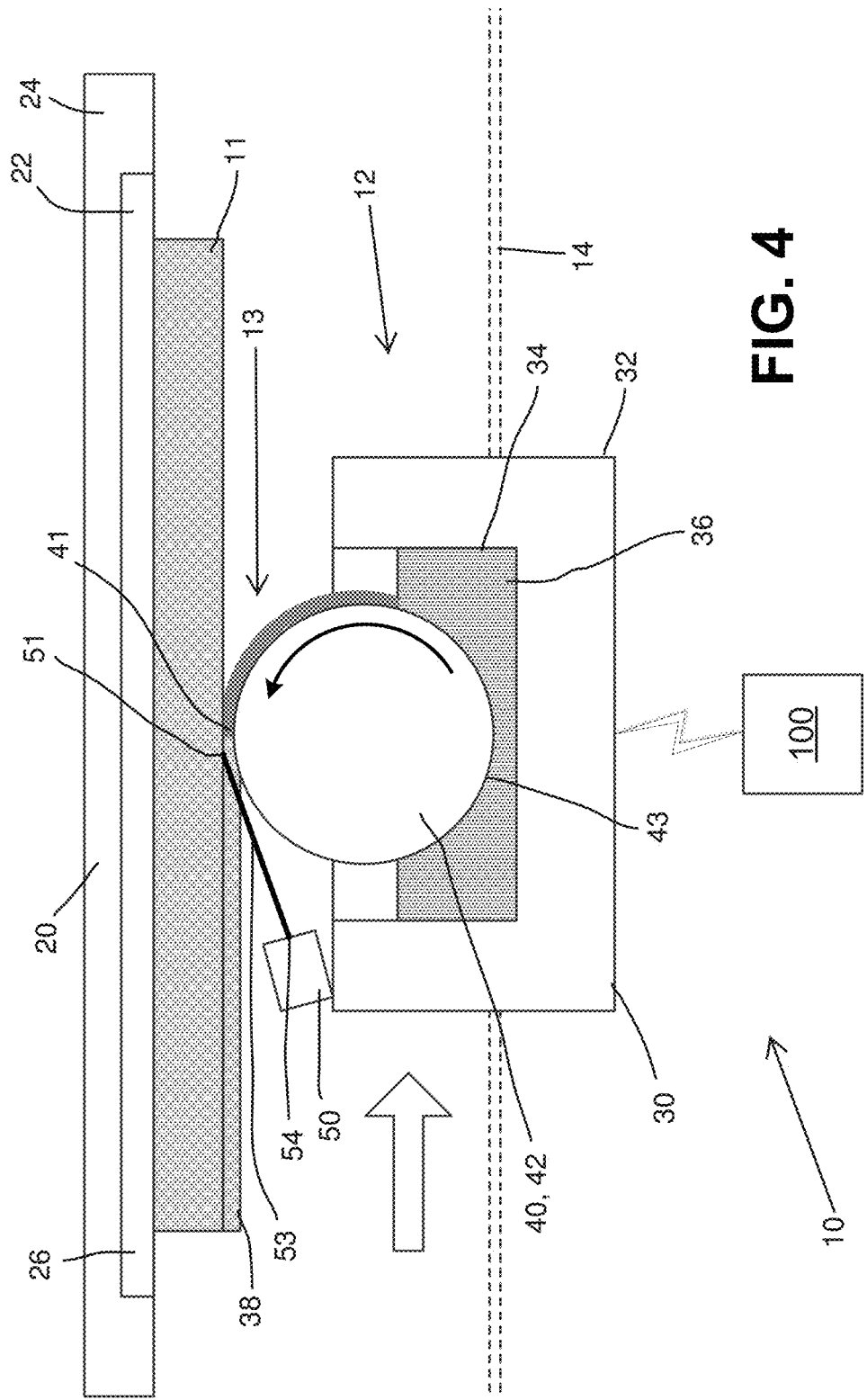
FIG. 4 is a side schematic view of another embodiment of a system and apparatus for producing a three-dimensional object in operation according to aspects of the disclosure.

In general, the disclosure relates to systems, apparatuses, and methods for producing three-dimensional objects in a layer-by-layer technique, such as additive manufacturing, 3-D printing, stereolithography, or other rapid prototyping techniques. Referring first to FIG. 1, there is schematically shown an example embodiment of a system 10 that includes a manufacturing apparatus 12 and a computer controller 100 in communication with one or more components of the apparatus 12 and configured for controlling operation of the apparatus 12 and/or the components thereof to manufacture an object 11. The apparatus 12 includes a support assembly 20 for supporting the object 11 within a build area 13 during manufacturing, a track 14 extending through the build area 13, and a material deposition mechanism 30 mounted on the track 14 and configured for producing the object 11 within the build area 13 through layer-by-layer application of a material. The material applied by the deposition mechanism 30 may be any flowable material (e.g., liquids, powders or other particulate solids, and combinations thereof) that are capable of being solidified to manufacture the object 11, such as by polymerization, phase change, sintering, and other techniques or combinations of such techniques. In one example, the material may be or include a resin that can be polymerized by exposure to electromagnetic waves such as light (visible, IR, or UV). When using a resin-based material for manufacturing, the deposition mechanism 30 may be referred to as a "resin deposition mechanism". FIGS. 3-4 and 25 illustrate additional schematic embodiments of the system 10 and apparatus 12, and FIGS. 8-13, and 15-19 illustrate structural embodiments of the apparatus 12. FIGS. 2A-B, 5A-7, 14, and 20-29 illustrate schematic embodiments of components and/or methods and configurations for operation of the system 10 and apparatus 12. Consistent reference numbers are used throughout this description to refer to structurally or functionally similar or identical components throughout the drawing figures, and it is understood that features and aspects of some embodiments that have already been described in sufficient detail may not be specifically re-described with respect to each embodiment for the sake of brevity.

Production of objects 11 through additive manufacturing often involves the production of support structure, which is formed during manufacturing and supports the object 11 during manufacturing, to be removed later. Such support structure can be formed of the same or a different material from the desired final portions of the object 11. Removal of such support structures can be accomplished using mechanical means (e.g., separation, breakage, machining), solvent-based means (e.g., use of a water-soluble polymer that can be washed away), or other means. Any support structure manufactured along with an object 11 as described herein will be considered to be part of the "object" as defined herein.

The support assembly 20 generally includes at least a build platform 22 that is configured to support the object 11 within the build area 13 during manufacturing. The build area 13 is defined in the area adjacent to the build platform 22, which is immediately below the build platform 22 in the embodiment of FIG. 1. The support assembly 20 in FIG. 1 includes a support platform 24 that is movable in the vertical (z) direction and supports a removable insert 26 that defines the build platform 22. The insert 26 may be removably connected to the support assembly 20 by mechanical connectors, such as clamps 28 as shown in FIGS. 2A and 2B or other mechanical structures, or various other removable connection mechanisms such as vacuum suction, magnetic attraction, releasable adhesive, and combinations of such mechanisms in certain embodiments. In one embodiment, as shown in FIGS. 2A and 2B, the insert 26 is removably connected to the support assembly 20 primarily by application of vacuum suction by a vacuum apparatus 21, with clamps 28 used as a backup or redundant connection structure in case of malfunction, power outage, etc. As shown in FIG. 2A, when the object 11 is to be supported by the support assembly 20, such as during manufacturing, the vacuum apparatus 21 applies suction to the insert 26 and the clamps 28 are closed to retain the insert 26 in connection with the support platform 24. As shown in FIG. 2B, when the object 11 is to be removed, the vacuum suction is ceased and the clamps 28 are released in order to permit removal of the insert 26 and the object 11 from the support assembly 20. The insert 26 may be flexible, in order to ease release of the object 11 from the insert 26 after removal. Further, it is understood that other removable configurations for the build platform 22 may exist, and may or may not use a definable support platform 24. For example, in the embodiments of FIGS. 8-11 and 15-19, the entire support platform 24 is removable to permit removal of the build platform 22 from the support assembly 20. It is also understood that the object 11 may be removed from the build platform 22 without removal of the build platform 22, and that the build platform 22 may include no removable structure in other embodiments.

In one embodiment, the support assembly 20 and the track 14 may be partially or completely modular. The support assembly 20 and track 14 in the embodiment of FIGS. 8-11 are configured in this manner. This permits ease of build-out and modification of the entire apparatus 12 as desired. This also permits assembling or disassembling the apparatus 12 to move it into or out of a room, even if the apparatus 12 is significantly larger than the door to the room, which can be an issue with current stereolithography machines.

Figure 15:
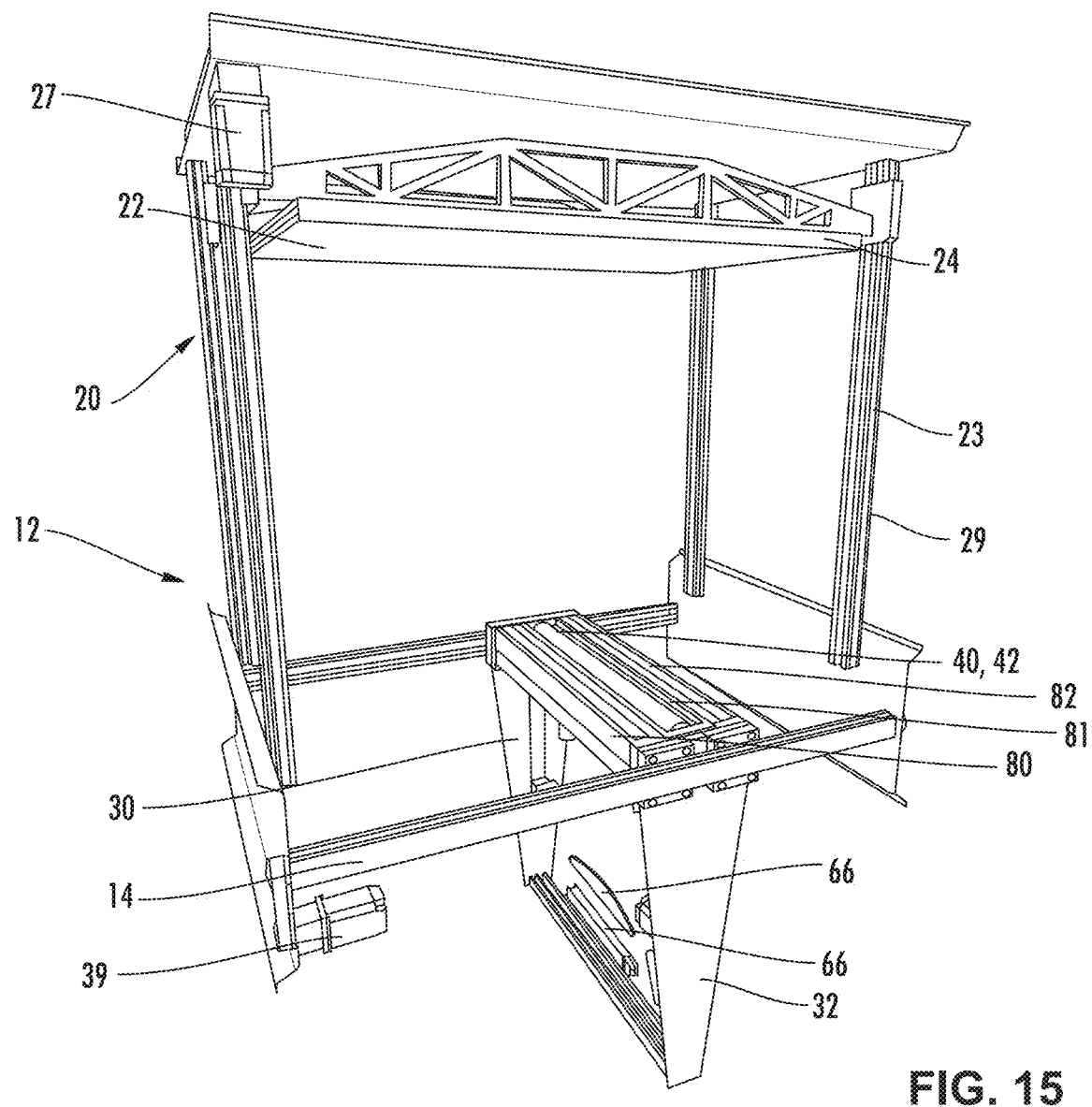
FIG. 15 is a perspective view of another embodiment of an apparatus for producing a three-dimensional object in operation, according to aspects of the disclosure.

The support assemblies 20 in the embodiments of FIGS. 8-11 and 15-19 include vertical positioning mechanisms 23 that are configured to change the height of the build platform 22 during manufacturing, as described elsewhere herein. In the embodiment shown in FIG. 8, the vertical positioning mechanism 23 includes multiple jack screws 25 positioned at opposite sides of the support assembly 20 and a support frame 27 that engages the jack screws 25 and connects to and supports the support platform 24. Vertical movement of the support platform 24 (and thereby, the build platform 22) is accomplished by rotation of the jack screws 25, and it is understood that the threading of the jack screws 25 may be angled to permit fine incremental changes in the vertical position of the build platform 22. The rotation of the jack screws 25 may be driven by a motor assembly (not shown) and controlled by the controller 100. In the embodiment of FIG. 15, the vertical positioning mechanism 23 includes four vertical drive mechanisms 29 located at four corners of the support assembly 20, with a support frame 27 that engages the vertical drive mechanisms 29 and connects to and supports the support platform 24. The vertical drive mechanisms 29 in FIG. 15 may be jack screws as described herein, or may use a different mechanical structure, such as chains, cables, belts, gears, sprockets, wheels, etc. The vertical drive mechanisms 29 may be driven by a motor assembly (not shown) and controlled by the controller 100.

FIG. 1 schematically illustrates an embodiment of the deposition mechanism 30, which generally includes a carriage 32 engaged with the track 14 and configured for movement along the track 14 and through the build area 13, a supply 34 of a flowable material 36 mounted on or otherwise operably connected to the carriage 32, an applicator 40 in communication with the supply 34 of the flowable material 36 and configured to apply the flowable material 36 to an application site 41 within the build area 13, and an exposure device 50 configured for emitting electromagnetic waves to solidify the applied material 36 to form the object 11. The application site 41 is generally defined as the area where the material 36 contacts the deposition surface, i.e., the build platform 22 or the surface of the object 11. Various embodiments of the deposition mechanism 30 are described herein, both schematically and with regard to specific structural embodiments. FIGS. 3 and 4 schematically illustrate embodiments of the deposition mechanism 30 that share many features in common with the embodiment of FIG. 1, and certain aspects of the embodiments of FIGS. 3 and 4 may be described only with respect to their differences from the embodiment of FIG. 1, for the sake of brevity. FIGS. 8-13 and 15-18 illustrate additional embodiments of the manufacturing apparatus 12 and the deposition mechanism 30 that include structures that may be more detailed than the schematic depictions and may have similar or different functionality.

The carriage 32 is configured to move along the track 14 to move the deposition mechanism 30 through the build area 13 during manufacturing. The track 14 is generally configured for guiding the carriage 32 of the deposition mechanism 30 through the build area 13 for creation of the object 11. The apparatus 12 may include a base frame 19 for supporting the track 14 and other components of the apparatus 12, as shown in FIGS. 8-11 and 15-19. The track 14 and the carriage 32 may have complementary engaging structure to permit movement of the carriage 32 along the track 14. For example, in the embodiments shown in FIGS. 8-11 and 15-19, the track 14 includes two parallel beams 15, and the carriage 32 and the track 14 have complementary gear surfaces 33 that allow the carriage 32 to roll along the beams 15 by rotation of the gear surfaces 33 on the carriage 32. The carriage 32 is powered for rotation of the gear surfaces 33 in the embodiments of FIGS. 8-11 and 15-19, and may otherwise be powered for movement in various embodiments, such as by wheels or other gear arrangements, etc. In other embodiments, the power for movement may be supplied by external mechanisms which may or may not be incorporated into the track 14, such as chains, cables, belts, sprockets, pistons, etc. An example of a drive motor 39 is shown in FIG. 15. The speed of the carriage 32 may be adjusted depending on the properties of the material 36, as materials 36 with different viscosities and/or solidification rates may benefit from faster or slower drive speeds. The carriage 32 may be configured to support other components of the deposition mechanism 30, such that the other components move with the carriage 32. For example, in the embodiments of FIGS. 1, 3, and 4, the carriage 32 supports at least the applicator 40, the exposure device 50, and the material supply 34. It is understood that these embodiments are depicted schematically and the carriage 32 may support additional components as well, including the controller 100 and/or other components not pictured. The carriage 32 may be configured for modular connection of components as well, as described elsewhere herein. The controller 100 may be configured to control the operation, speed, elevation, and other aspects of the carriage 32

In the embodiments of FIGS. 1, 3-4, 8-13, and 15-19, the applicator 40 includes or is in the form of a roller 42 that is in communication or contact with the material supply 34. In these embodiments, the roller 42 is cylindrical and has a cylindrical outer surface 43 in contact with the supply 34. In the embodiments of FIGS. 1 and 3, the roller 42 is hollow or otherwise has an inner chamber, but may alternately be a solid cylinder, e.g., in the embodiments of FIGS. 3-4. The roller 42 rotates so that material 36 is picked up on the outer surface 43 of the roller 42 and is carried to the application site 41 for manufacturing of the object 11. The roller 42 may be powered for rotation by any of various mechanisms, such as gears, sprockets, wheels, belts, etc. In one embodiment, the roller 42 is configured to rotate in conjunction with the movement of the carriage 32, i.e., such that the top of the roller 42 is moving in the opposite direction to and at approximately the same speed as the movement of the carriage 32. This is schematically shown in FIGS. 1 and 3-4 and avoids drag and/or shear on the surface of the object 11 and the applied material 36. In another embodiment, the roller 42 may be configured to rotate at a different speed, i.e., faster or slower than the translational movement speed across the deposition surface. It is contemplated that rotating the roller 42 faster than the translational movement speed can improve curing of the material 36 at the deposition surface, by increasing exposure time of the material 36 at the deposition surface relative to the material 36 on the surface 43 of the roller 42. The roller 42 may further be made from a material that is permeable to the electromagnetic waves that are emitted by the exposure device 50, such that the waves can pass through the roller 42 relatively unchanged. The application site 41 is generally defined between the outer surface 43 of the roller 42 and the deposition surface, i.e., the build platform 22 or the surface of the object 11. The spacing between the outer surface 43 of the roller 42 and the deposition surface may define the thickness of the material 36 that is deposited, and the ultimate thickness of the solidified material layer 38. It is understood that the material of the roller 42 may be customized to the specific wavelength of the electromagnetic waves to ensure sufficient permeability. The applicator 40 may have a different configuration in another embodiment, and may carry the material 36 to the application site 41 using a different mechanism. The applicator 40 may further have a different orientation relative to the build platform 22, such as shown in FIG. 25.

In the embodiments of FIGS. 1, 3-4, 8-13, and 15-19, the supply 34 is configured as a vat of the flowable material 36 that is in contact with the roller 42, such that rotation of the roller 42 carries the material 36 to the application site 41. In this configuration, the flowable material 36 should have sufficient viscosity that the roller 42 is able to carry a continuous layer of the uncured flowable material 36 to the application site 41. The desired viscosity of the flowable material 36 may depend on the desired build speed or rotation speed of the roller 42, or on the level of the roller 42 relative to the level of the material 36 in the supply 34. A slower rotation speed and/or a lower vat material 36 level may require higher viscosity material 36. It is understood that the power of the exposure device 50 may require a slower or faster speed, as more powerful waves 53 can solidify materials (e.g., polymerizing resins) more quickly. In another embodiment, the supply 34 may be more complex, such as by including injectors or nozzles to force the material 36 onto the roller 42. In the embodiment of FIGS. 15-19, the supply 34 includes fluid connectors 35 that may permit removable connection of a container of additional material 36 for refill or maintenance of the level of the material 36 in the vat. Additionally, the supply 34 of the flowable material 36 may be configured differently if the configuration of the applicator 40 is changed, and the supply 34 may be configured to be compatible with the design of the applicator 40, or vice-versa.

Figure 27:
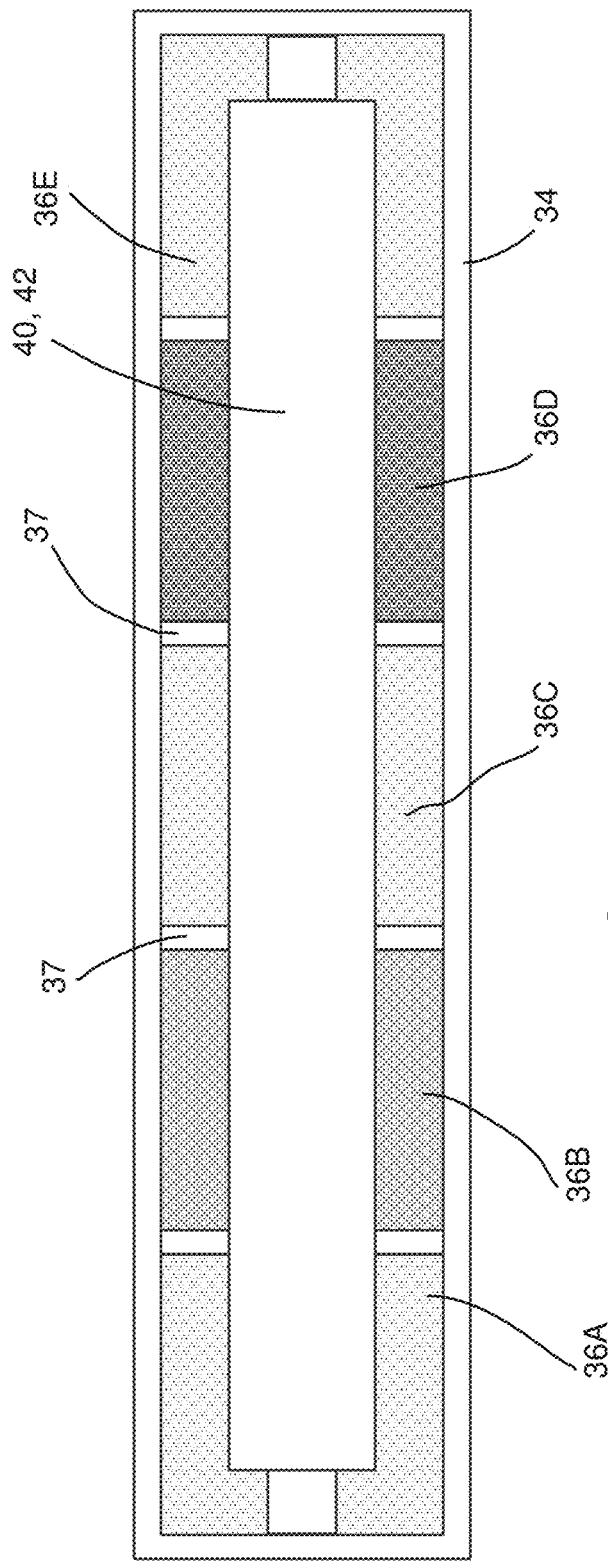
FIG. 27 is a top schematic view of another embodiment of an applicator and a supply of flowable material according to aspects of the disclosure.

In one embodiment, shown in FIG. 27, the supply 34 may be configured to hold multiple flowable materials 36A-E to permit the deposition mechanism 30 to build multiple objects 11 out of different materials 36A-E or a single object 11 out of different materials 36A-E simultaneously. As shown in FIG. 27, the supply 34 may be configured as a vat that has partitions 37 to separate the different materials 36A-E. The partitions 37 may be adjustable to alter the ratios and boundaries of the different materials 36A-E as desired. It is understood that descriptions of using "different materials" as used herein may also enable usage of the same material with different colorings.

The exposure device 50 is generally configured for emitting electromagnetic waves 53 to solidify the applied material 36 to form the object 11. The wavelength and intensity of the electromagnetic waves may be selected based on the material 36 to be solidified and the speed or mechanism of solidification. For example, when a light-curable resin is used as the material 36, the exposure device 50 may be configured to emit light (visible, IR, UV, etc.) that is an appropriate wavelength for curing/polymerizing the resin to form a solid material layer 38. As another example, if a sintering process is used to solidify the flowable material 36, the waves 53 emitted by the exposure device 50 may have sufficient power to sinter the material 36 to form a solid material layer 38. The exposure device 50 may also include various components and structures to direct the emitted waves toward an exposure site 51 within the build area 13, where the material 36 is exposed to the waves at the exposure site 51. The waves may be directed so that the exposure site 51 is located approximately at the application site 41 in one embodiment, or so that the exposure site 51 is offset from the application site 41 (ahead or behind the application site 41 in the direction of travel) in another embodiment. FIGS. 1 and 3 illustrate (with solid lines) the waves 53 being directed to an exposure site 51 approximately at the application site 41, and further illustrate (with broken lines) the waves 53 alternately being directed to an exposure site 51 offset behind or ahead of the application site 41. FIG. 4 illustrates the waves 53 being directed to an exposure site 51 offset behind the application site 41.

Figure 5A:
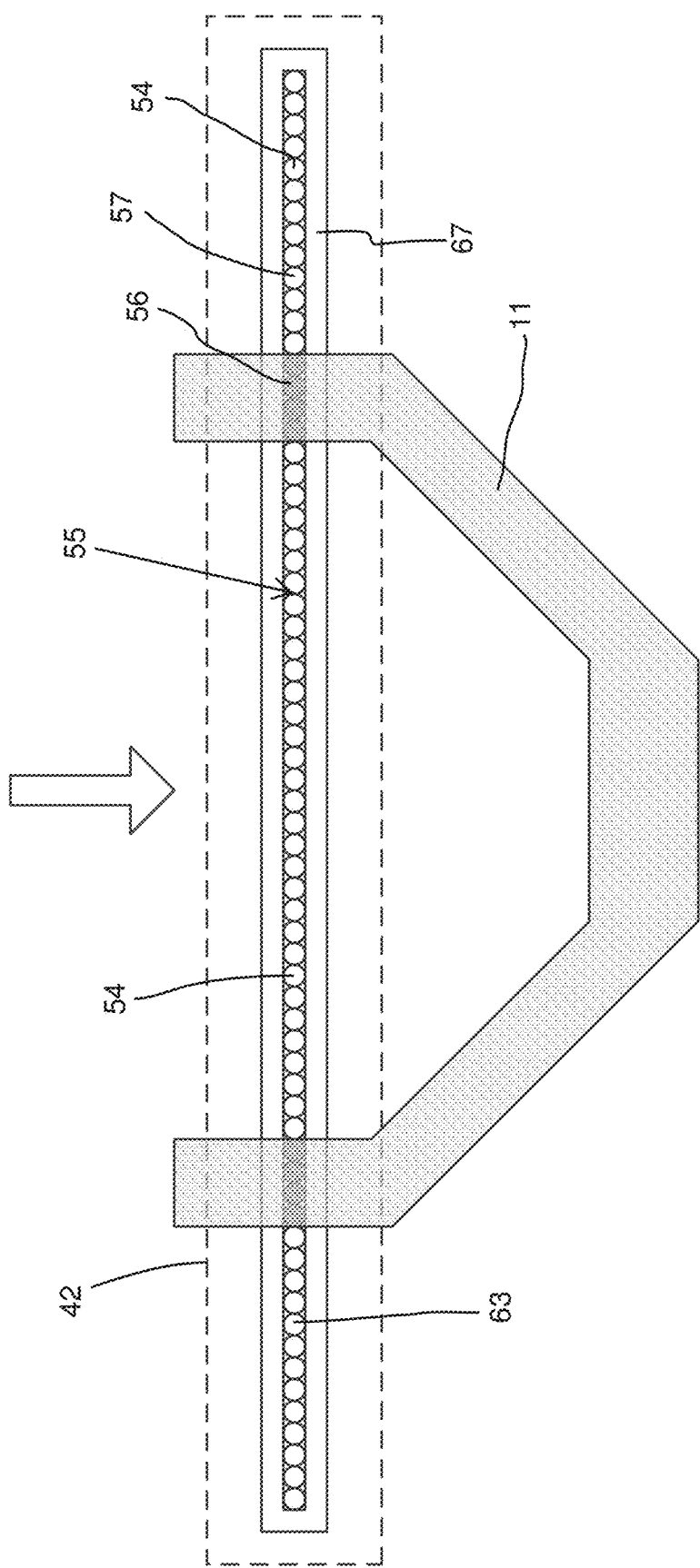
FIGS. 5A and 5B are top schematic views of the system and apparatus of FIG. 1 in operation, according to aspects of the present disclosure.
Figure 5B:
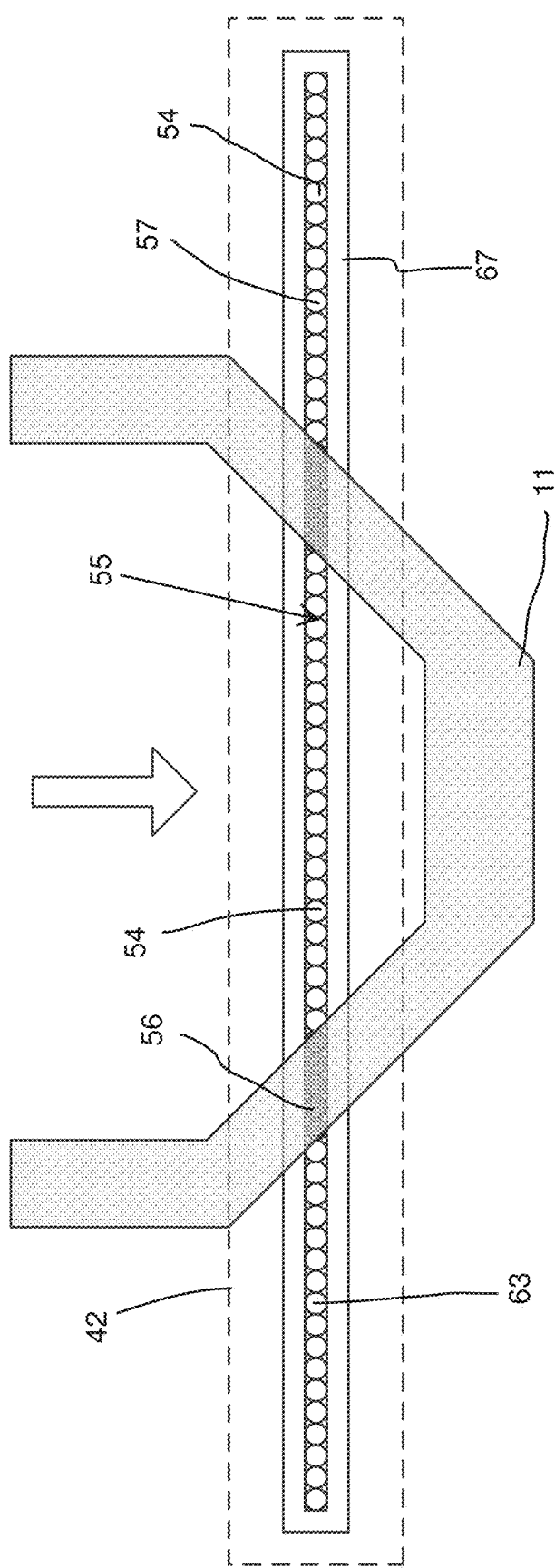

In general, the exposure device 50 is configured such that waves generated by the exposure device exit through outlets 54 and are directed toward specific areas of the exposure site 51 to permit selective solidification of the material 36 at the selected areas of the exposure site 51 as the deposition mechanism 30 passes. In one embodiment, the exposure device 50 is part of an exposure assembly 60 that includes components designed to direct and/or focus the waves 53 toward the exposure site 51. The outlets 54 may be arranged in an array 55, and specific outlets 54 along the array 55 may be selectively activated to selectively solidify portions of the material 36, as shown in FIGS. 5A and 5B. FIGS. 5A and 5B illustrate the active outlets 56 as being darkened, and the inactive outlets 57 as being light. As seen in FIGS. 5A and 5B, the active outlets 56 and inactive outlets 57 are changed when the roller 42 reaches a point where the shape or contour of the object 11 changes. The selective activation and deactivation of the outlets 54 may be controlled by the controller 100, as described herein. The array 55 in FIGS. 5A and 5B is illustrated as a single horizontal row of outlets 54. In other embodiments, the array 55 may be arranged differently, such as in multiple, offset horizontal rows. The use of multiple rows in the array 55 can permit closer lateral spacing between the outlets 54 than the use of a single row. The array 55 in FIG. 14 may similarly be configured and arranged according to any of these embodiments.

Figure 16:
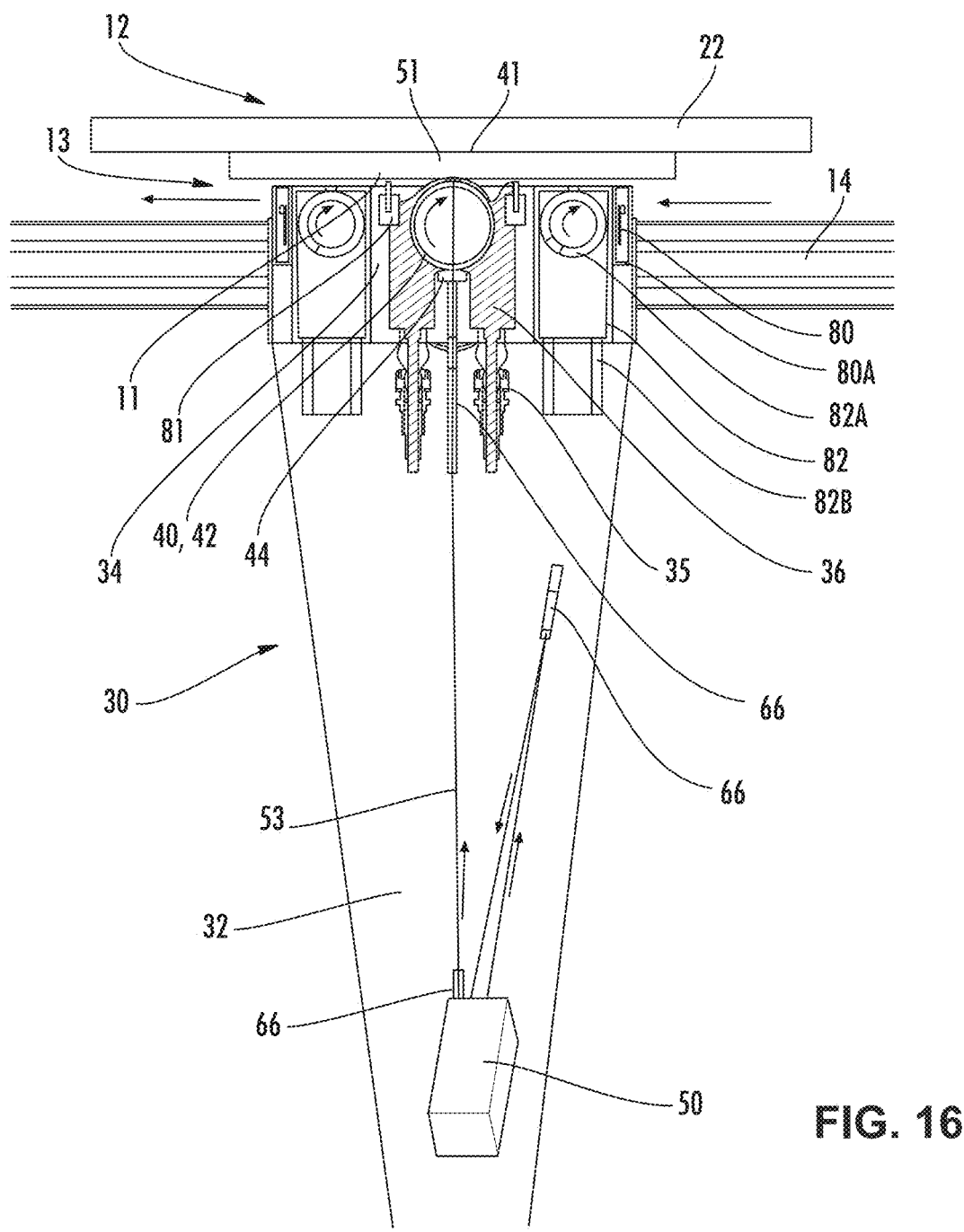
FIG. 16 is a side view of a deposition mechanism of the apparatus of FIG. 15.
Figure 17:
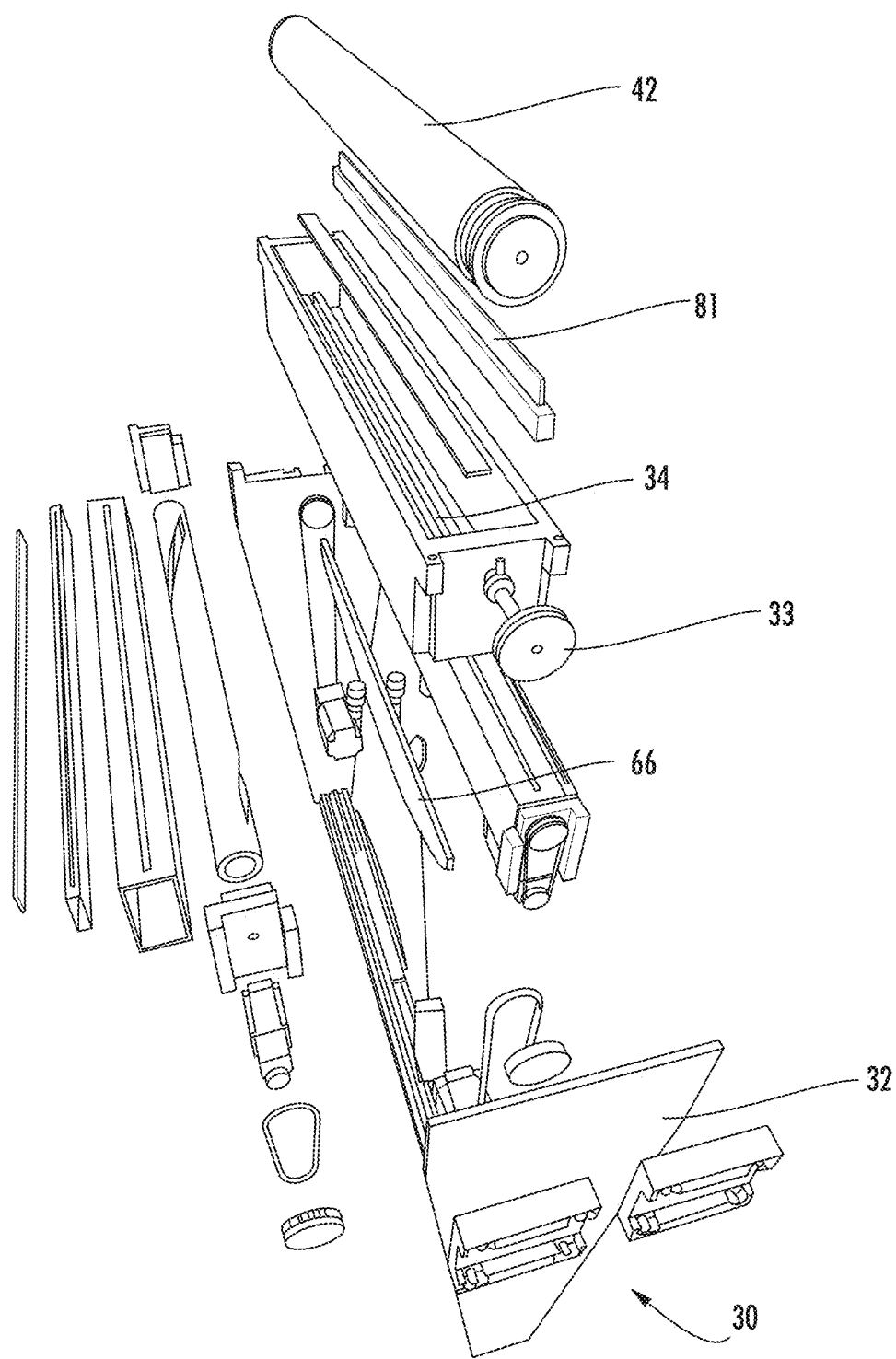
FIG. 17 is an exploded view of the deposition mechanism of FIG. 16.
Figure 18:
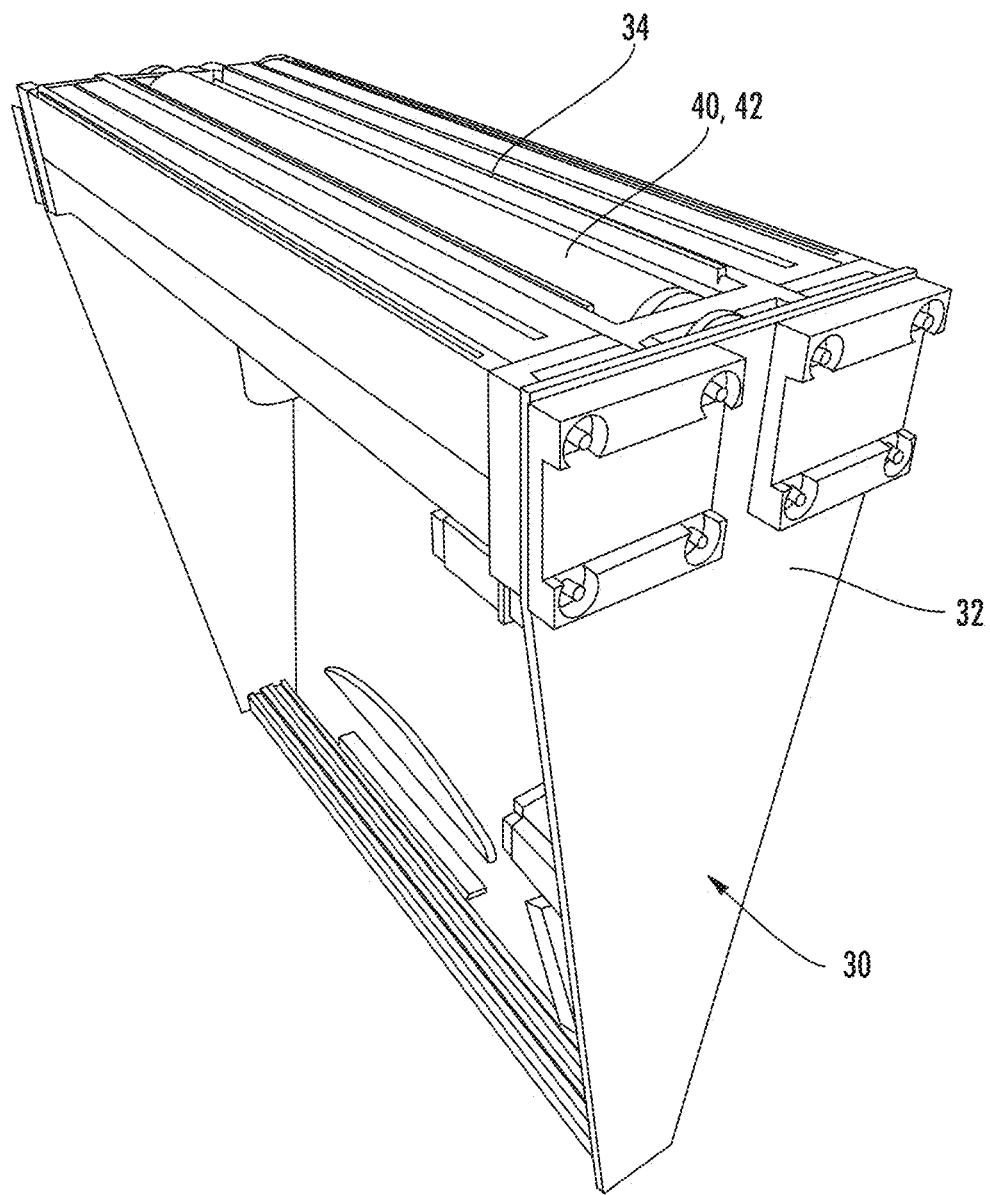
FIG. 18 is a perspective view of the deposition mechanism of FIG. 16.

As described above, the waves 53 may penetrate the roller 42 on their path to the exposure site 51. In the embodiment of FIG. 1, the outlets 54 are located inside the roller 42 and the emitted waves 53 penetrate the surface of the roller 42 once on their paths to the exposure site 51. In the embodiment of FIG. 1, the exposure device 50 itself may be located within the roller 42, or the exposure device 50 may be located outside the roller 42, with the outlets 54 positioned within the roller, as in the embodiment of FIGS. 8-13. In the embodiment of FIG. 3, the outlets 54 are located below the roller 42 and the emitted waves 53 penetrate entirely through the roller 42 in their paths to the exposure site 51. The embodiment of FIGS. 15-18 is similarly configured. In this configuration, the deposition mechanism 30 may include a window 44 configured to permit the waves 53 to pass through the wall of the supply vat 34, as shown in FIGS. 16-17. Additional structures such as squeegees, gaskets, or other sealing structures may be used to resist resin ingress between the roller 42 and the window 44. In the embodiment of FIG. 4, the outlets 54 are positioned and directed to an exposure site 51 located immediately behind the application site 41, and the waves 53 do not need to pass through the roller 42 in this embodiment. It is understood that the waves 53 in the embodiment of FIG. 4 may be directed to pass through a portion of the roller 42 if so desired.

Figure 12:
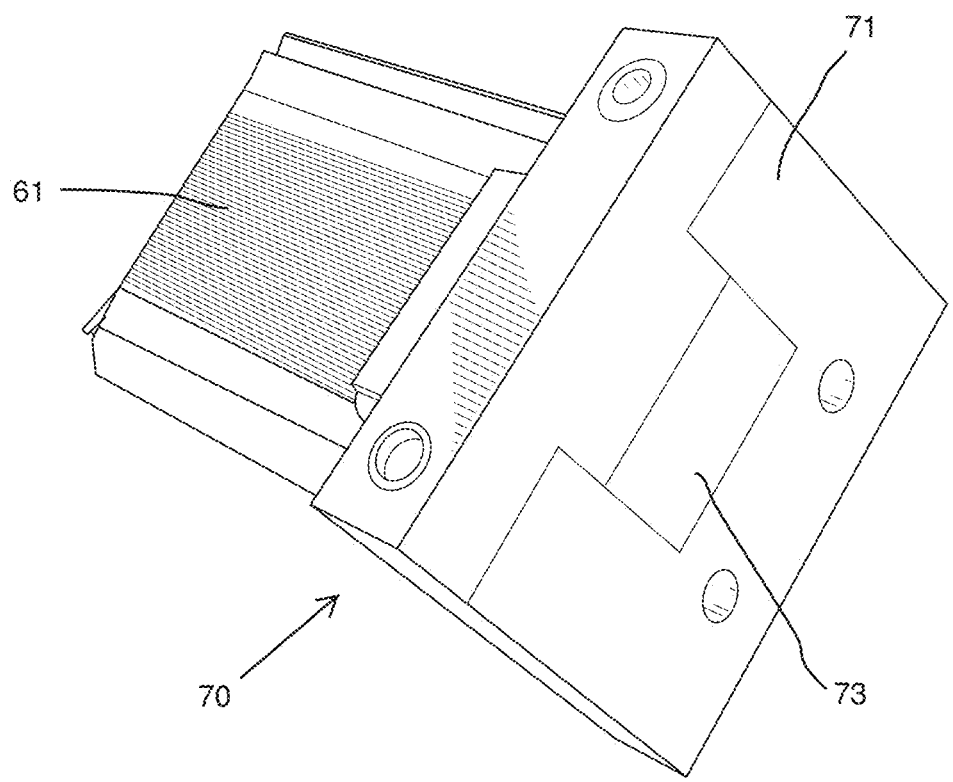
FIG. 12 is a perspective view of one embodiment of a collector for use with the deposition mechanism of FIG. 8, according to aspects of the disclosure.
Figure 13:
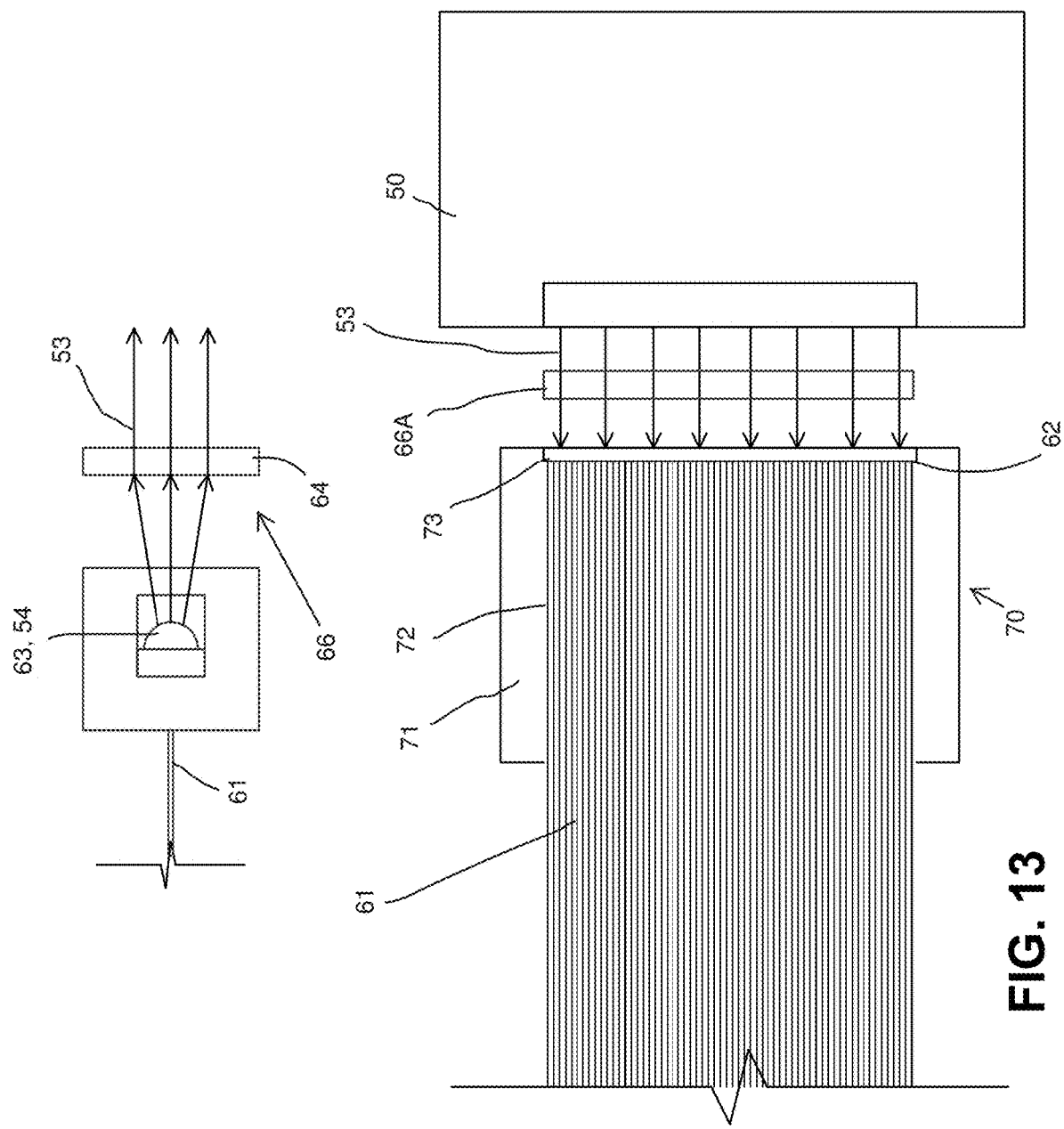
FIG. 13 is a schematic view of the collector of FIG. 12 shown in operation with one embodiment of an exposure device according to aspects of the disclosure.

In one embodiment, the exposure device 50 is a projector, such as a Digital Light Processing (DLP) projector, as the source of the waves 53, and the exposure assembly 60 may also use optical fibers 61 to direct the waves 53 to the exposure site 51, as shown in FIGS. 8-13. In this embodiment, the projector 50 is configured such that the light emitted by the projector 50 enters the entrance ends 62 of the optical fibers 61, travels down the optical fibers 61, and exits through the exit ends 63 of the optical fibers 61, directed at the exposure site 51. The outlets 54 in this embodiment are formed by the exit ends 63 of the optical fibers 61, and may be located inside the roller 42 and arranged as an array 55 inside the roller, as shown in FIGS. 1, 5A-B, and 8-12. In such an embodiment, the optical fibers 61 may extend into the roller 42 from one or both ends of the cylinder, and appropriate sealing and bracing components may be used around the optical fibers 61 in this case. For example, in the embodiment of FIGS. 8-12, the exit ends 63 of the optical fibers 61 may be gathered and held in place by a casing or similar structure 67 (see FIGS. 5A-5B). The exposure assembly 60 may further use a focusing mechanism 66 to focus the light waves 53 after they exit the exit ends 63 of the optical fibers 61, as illustrated in FIG. 13. In one embodiment, the focusing mechanism 66 includes a micro-lens array 64 between the exit ends 63 of the optical fibers 61 and the object 11, such as a Selfoc Lens Array (SLA) lens, that focuses the waves 53 and avoids diffraction on the path to the exposure site 51. FIGS. 8-12 illustrate a micro-lens array 64 being held in place within the roller 42 by braces 65. In other embodiments, various other lenses, mirrors, and other focusing equipment may be used. It is understood that such a focusing mechanism 66 may be used in other embodiments described herein, such as the embodiments of FIGS. 3, 4, 15-18, and 25.

The exposure assembly 60 in the embodiment of FIGS. 8-13 uses a collector 70 engaged with the entrance ends 62 of the optical fibers 61 to fix the entrance ends 62 in position with respect to the exposure device 50, such that the waves 53 enter the entrance ends 62 of the optical fibers 61 at the collector 70. One embodiment of the collector 70 is illustrated in FIG. 12 and schematically in FIG. 13. The collector 70 includes a frame 71 that engages the entrance ends 62 of the optical fibers 61 and holds the entrance ends 62 within a chamber or passage 72, with a window 73 (which may be configured as a lens in one embodiment) positioned at the end of the passage 72. Waves 53 exiting the exposure device 50 pass through the window 73 to enter the entrance ends 62 of the optical fibers 61. A lens 66A may be positioned between the exposure device 50 and the window 73 to focus the waves 53 at this stage. The frame 71 is held firmly in place relative to the exposure device 50, so that the entrance ends 62 of the optical fibers 61 do not move relative to the exposure device 50. This fixed relative positioning permits the exposure device 50 to selectively activate and deactivate the outlets 54 by use of pixel mapping. In other words, the entrance end 62 of each optical fiber 61 is mapped to one or more specified pixels of the exposure device 50, such that activating the specified pixel(s) causes waves 53 emitted by the specified pixel(s) to travel down the optical fiber 61, thereby activating the outlet 54 associated with that optical fiber 61. The pixel mapping also incorporates mapping of the specific area of the exposure site 51 toward which the outlet 54 of each optical fiber 61 is directed. In one embodiment, where a DLP projector is used as the exposure device 50, each optical fiber 61 is mapped to a plurality of pixels (potentially hundreds or more) of the DLP projector. In such a configuration, loss or inactivation of multiple pixels can occur without affecting the ability of the optical fiber 61 to maintain sufficient functionality and power for operation. The use of the collector 70 and optical fibers 61 as described herein achieves the conversion of a two-dimensional projection into a roughly one-dimensional (linear) exposure. This mapping may be stored in computer memory and executed by a computer processor, such as by the controller 100.

Figure 14:
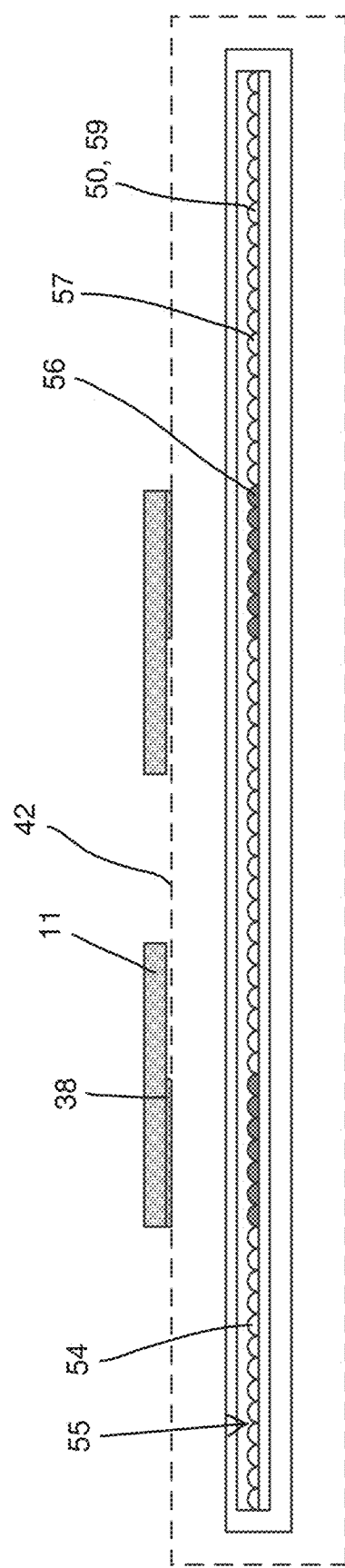
FIG. 14 is a side schematic view of another embodiment of an exposure device according to aspects of the disclosure.

In another embodiment, the exposure device 50 is in the form of an array 55 of LEDs 59 that function as the sources of the waves 53, as shown in FIG. 14. The LEDs 59 may be designed to emit waves 53 of the proper wavelength and intensity for solidifying the material 36. The array 55 of LEDs 59 can be positioned within the roller 42 as shown in FIG. 14, or outside the roller 42 as described herein, and may use a focusing mechanism 66 as also described herein. In either case, a micro-lens array 64 at the outlets 54 as described above may assist in focusing the waves 53. Each of the LEDs 59 in this embodiment constitutes a separate outlet 54 that is directed at a specific area of the exposure site 51, and the LEDs 59 can be selectively activated and deactivated to expose that specific area of the exposure site 51 to the waves 53. The activated LEDs 59 constitute active outlets 56 and are shown as being darkened in FIG. 14, and the inactive LEDs 59 constitute inactive outlets 57 that are shown as being light. As seen in FIG. 14, the material 36 aligned with the active outlets 56 is being solidified to form a layer 38. The LEDs 59 may be mapped to the specific areas of the exposure site 51 toward which they are directed, and this mapping may be stored in computer memory and executed by a computer processor, such as by the controller 100. If the LEDs 59 are positioned outside the roller 42, a plurality of optical fibers 61 may be used in conjunction with the LEDs 59, forming the outlets 54. Each LED 59 may be mapped to an individual optical fiber 61 in this configuration. In further embodiments, a different type of exposure device 50 may be used, and the deposition mechanism 60 may include components configured to direct the waves 53 from the exposure device to the proper areas of the exposure site 51. For example, in the embodiment of FIGS. 15-19, the exposure device 50 is in the form of a laser, and a focusing mechanism 66 including lenses and/or mirrors is used to focus the beam. The focusing mechanism 66 in FIGS. 16-17 includes one or more lenses 66A and one or more mirrors 66B.

During operation of the apparatus 12, the spacing between the applicator 40 and the deposition surface must be changed for each new layer 38 of the object 11 that is deposited. The applicator 40 in the embodiments of FIGS. 1, 3-4, 8-11, and 15-19 is oriented so that the roller 42 is positioned vertically below the deposition surface and forms the layer 38 vertically above the roller 42. In this embodiment, relative vertical (i.e., z-axis) translation occurs between the applicator 40 and the deposition surface during manufacturing of successive layers 38. This vertical translation is illustrated, e.g., in FIGS. 6A and 6B, which illustrate the deposition mechanism 30 making a first pass (FIG. 6A) from left to right to deposit a first layer 38 and a second pass (FIG. 6B) from right to left to deposit a second layer 38, where the vertical translation between the first and second passes is shown in phantom lines. This relative change in positioning can be accomplished using one or more different methods and mechanisms or combinations thereof. In the embodiments of FIGS. 8-11 and 15-19, this vertical translation can be accomplished by changing the elevation of the build platform 22, using a vertical positioning mechanism 23 as described herein. In another embodiment, this vertical translation can instead be accomplished by changing the elevation of the track 14, which may be accomplished using similar vertical positioning mechanisms 23 as described herein. In a further embodiment, the deposition mechanism 30 may include a mechanism for changing the vertical position of the applicator 40 relative to the build platform 22, such as by raising or lowering the applicator 40 and/or the entire chassis 32. For example, in the embodiment of FIGS. 20A-B, the deposition mechanisms 30 each are capable of vertical translation relative to the track 14 through a limited range of motion by raising or lowering the carriage 32 relative to the track 14. The vertical translation may be accomplished by switching the carriage 32 between pre-set vertical positions, such as by vertically moving the drive structure that engages the track 14 with respect to the roller 42. The primary vertical translation of the build platform 22 relative to the applicator 40 in this embodiment is accomplished by movement of the build platform 22 as described herein, and the vertical positioning range of the deposition mechanism 30 permits multiple deposition mechanisms 30 to make passes through the build area 13 without adjusting the position of the build platform 22, which is more time-consuming. The operation of these embodiments are described in further detail herein.

Figure 7:
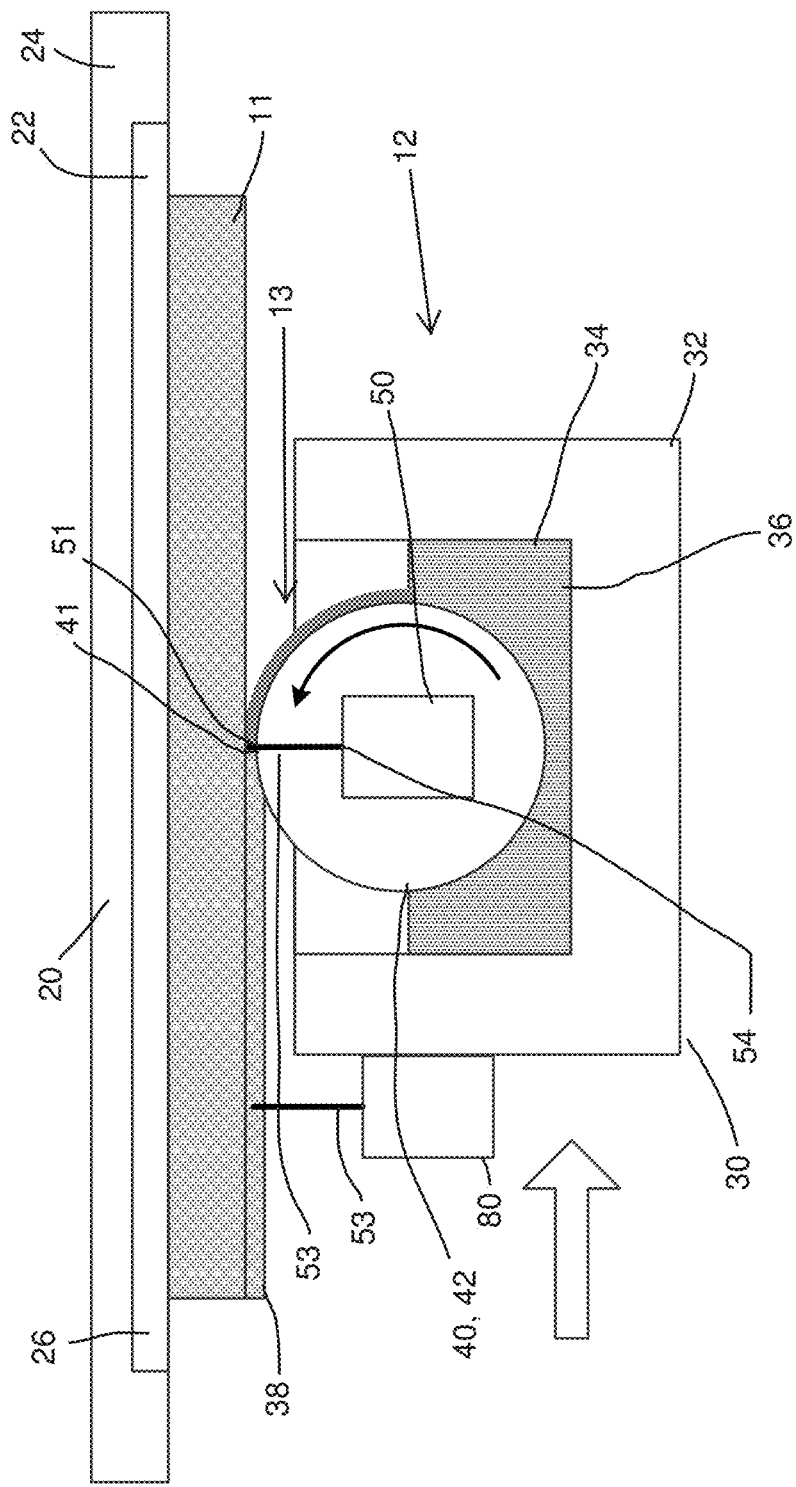
FIG. 7 is a side schematic view of the apparatus of FIG. 1, further including a secondary exposure device.
Figure 8:
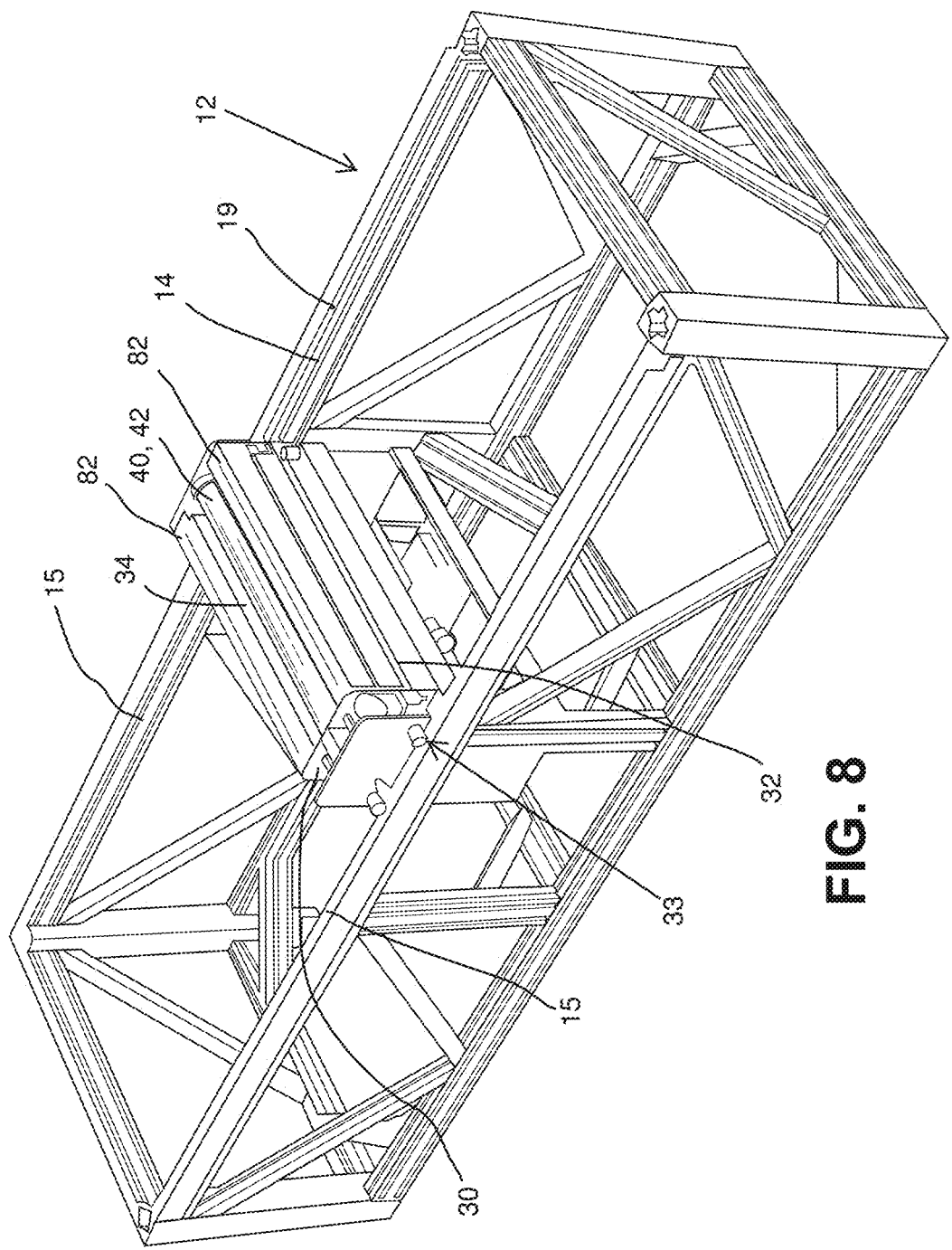
FIG. 8 is a top perspective view of another embodiment of an apparatus for producing a three-dimensional object, according to aspects of the disclosure.
Figure 9:
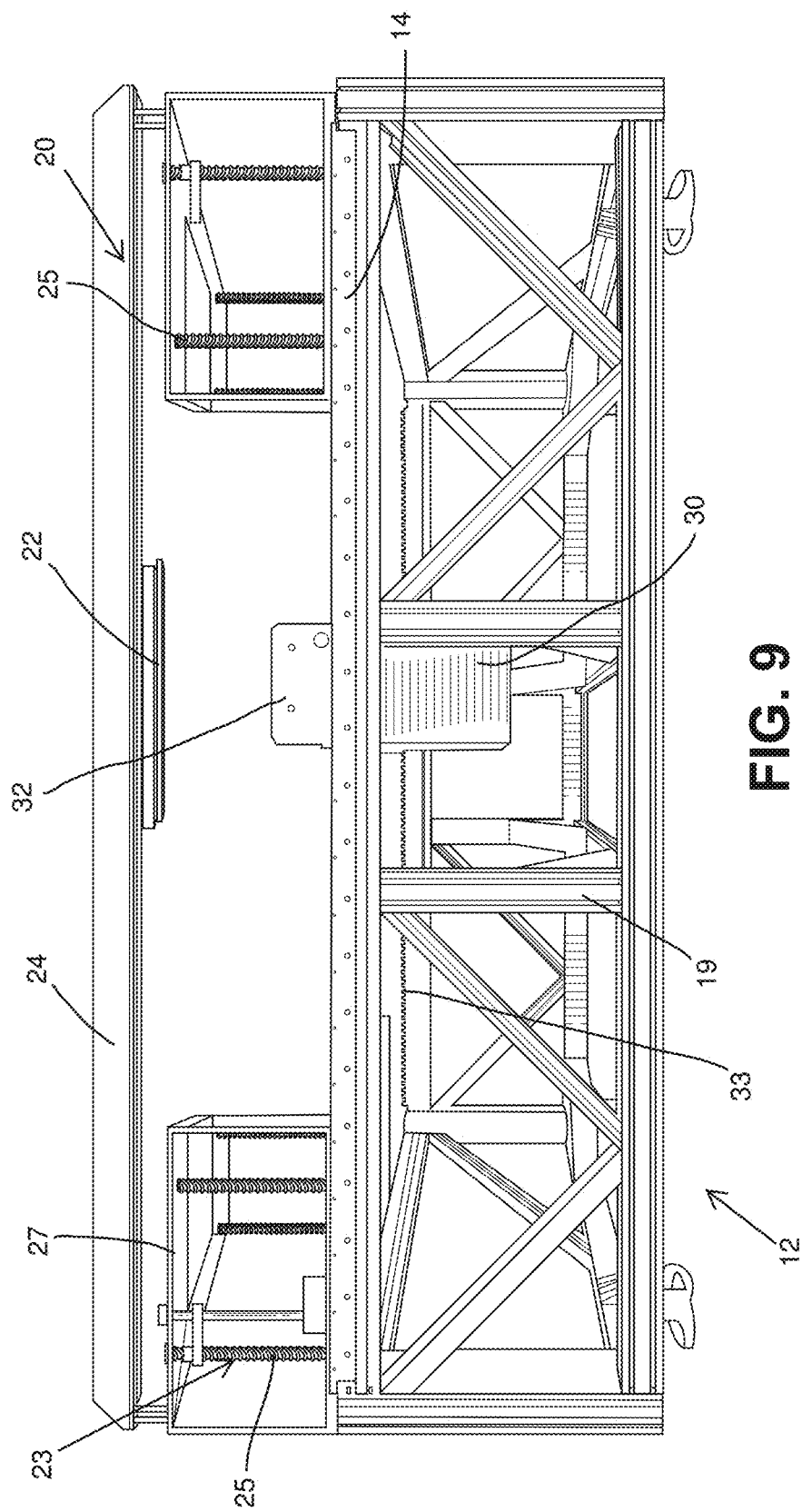
FIG. 9 is a side view of the apparatus as shown in FIG. 8.
Figure 10:
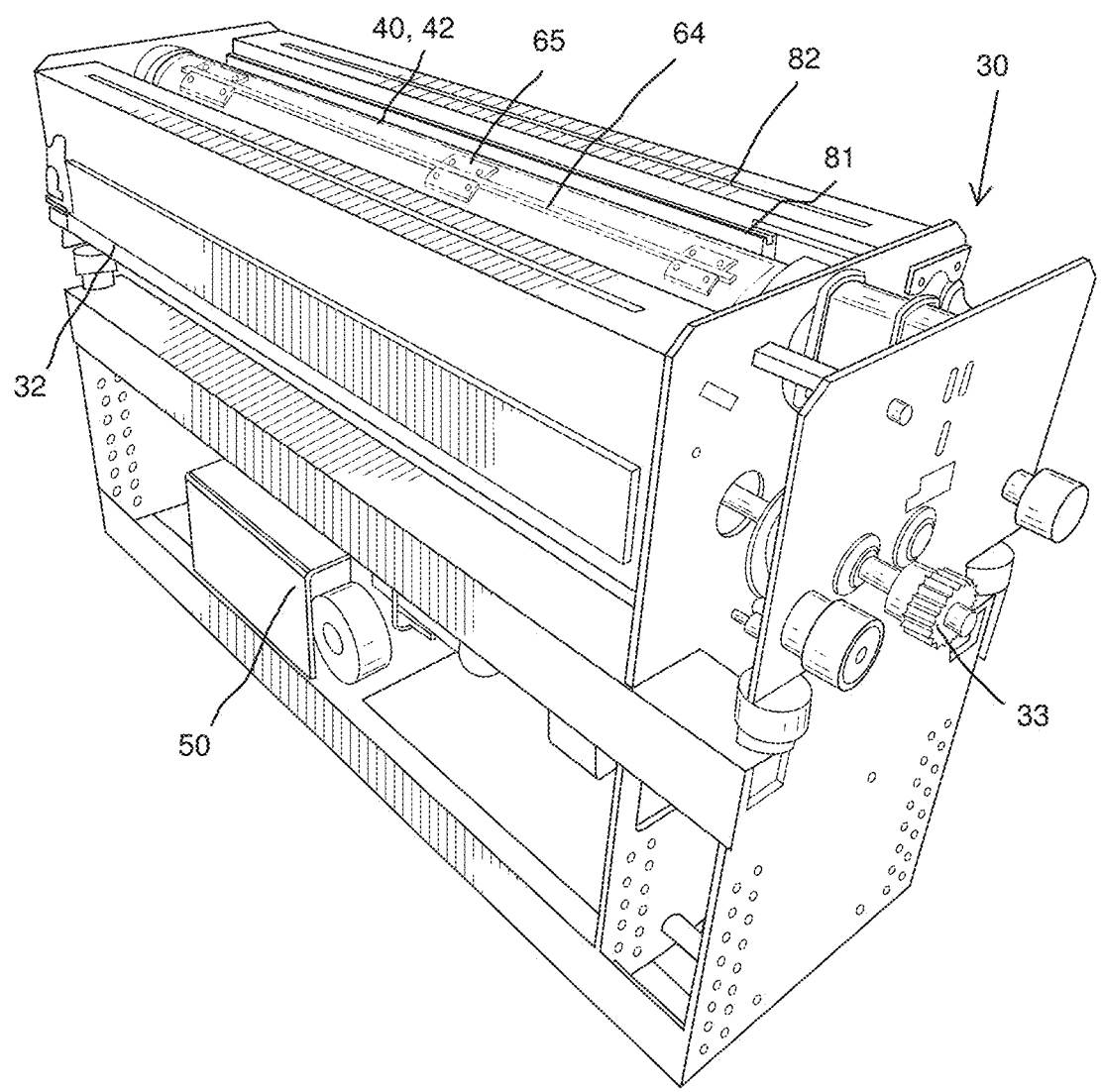
FIG. 10 is a top perspective view of a deposition mechanism of the apparatus as shown FIG. 8.
Figure 11:
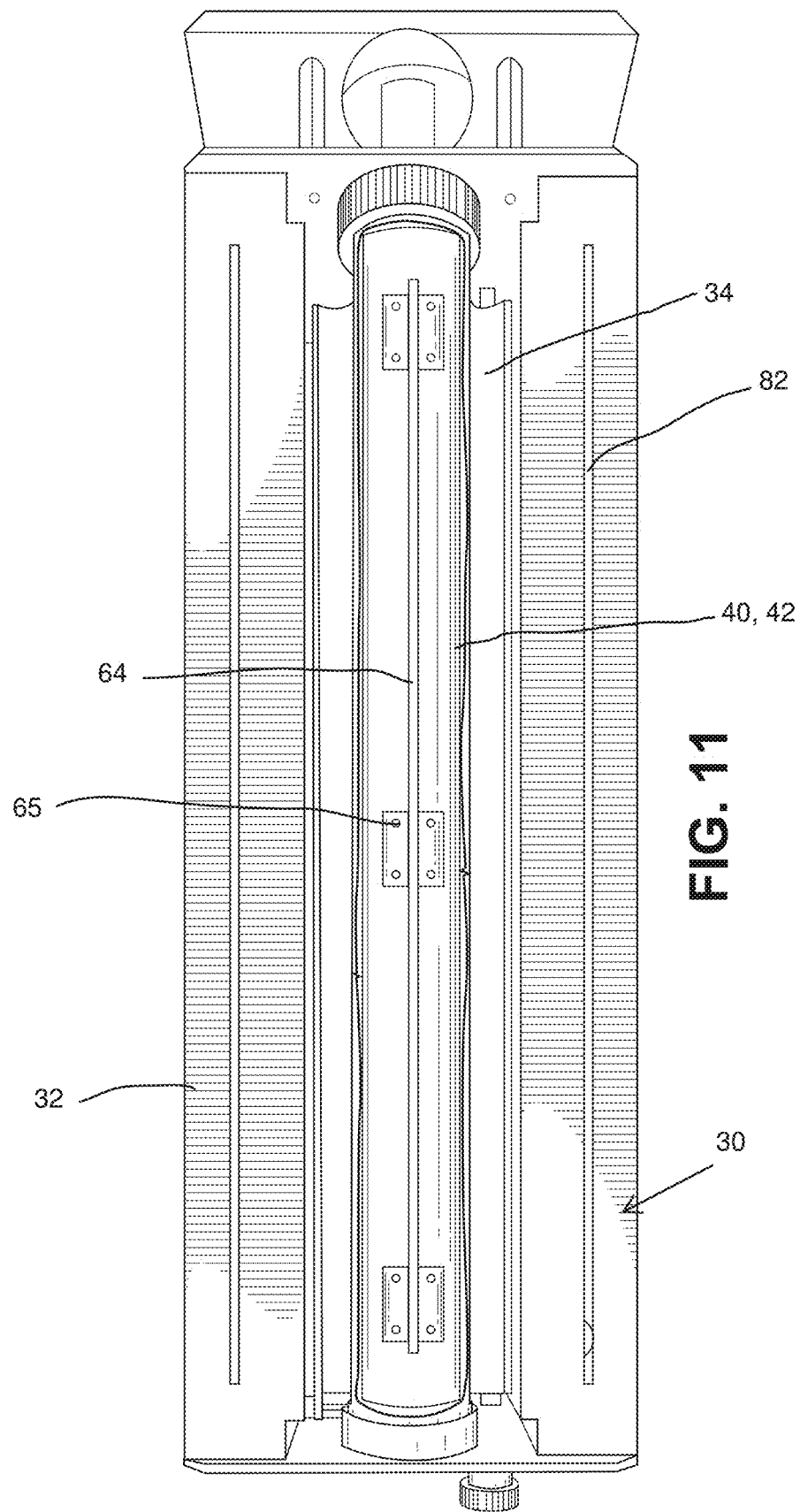
FIG. 11 is a top view of the deposition mechanism of the apparatus as shown in FIG. 10.

The deposition mechanism 30 may include further additional components to provide additional functionality in producing a high-quality object 11. It is understood that any of the example embodiments herein may include any combination of these additional components, even if not specifically illustrated herein. For example, the deposition mechanism 30 may include one or more secondary exposure devices 80, configured to trail the applicator 40 in the direction of movement, as shown in FIG. 7. The secondary exposure device 80 emits additional electromagnetic waves 53 to further solidify the material, which waves 53 may have the same or different wavelength and intensity as the waves 53 from the exposure device 50. In one embodiment, the secondary exposure device 80 does not need to be precisely focused, as it is acceptable for the entire surface of the object 11 to be irradiated. In this configuration, the waves 53 from the exposure device 50 may be configured to only solidify the material 36 enough to form a stable layer 38 (known as a "green state"), and the secondary exposure device 80 then further solidifies the layer 38 to the desired final degree of solidification. This presents a significant efficiency advantage over existing processes, where objects 11 are typically produced in the green state and require a subsequent separate irradiation step for full curing. The embodiment of FIGS. 15-19 includes two secondary exposure devices 80, to permit secondary exposure of the layer 38 while the carriage 32 is traveling in two opposite directions without making a 180° turn. The leading secondary exposure device 80 may be deactivated for each pass of the carriage 32, with the trailing secondary exposure device 80 being active, or both secondary exposure devices 80 may be active. Components 80A of the secondary exposure device 80 are illustrated in FIG. 16. The controller 100 may control activation of the secondary exposure device(s) 80.

As another example, the deposition mechanism 30 may include one or more material removal mechanisms configured to remove excess and/or unsolidified material, such as one or more squeegees 81 or one or more contactless vacuum squeegees 82. For example, the embodiment in FIGS. 15-19 includes two squeegees 81 positioned on alternate sides of the roller 42, which wipe the surface of the layer 38 to remove excess and/or unsolidified material 36 after the solidification process. In one embodiment, the squeegees 81 may be configured to be raised and lowered, so that only the trailing squeegee 81 engages the surface of the object 11, which operation may be controlled by the controller 100. As another example, the embodiment in FIGS. 15-19 also includes two vacuum squeegees 82 positioned on alternate sides of the roller 42, which blow or suck away excess and/or unsolidified material 36 after the solidification process through application of vacuum airflow. Components 82A-B of the vacuum squeegees 82 are shown in FIG. 16. In one embodiment, the vacuum squeegees 82 may be configured to be activated and deactivated, so that only the trailing vacuum squeegees 82 affects the surface of the object 11, which operation may be controlled by the controller 100. The embodiment in FIGS. 8-11 includes squeegees 81 and vacuum squeegees 82 configured similarly to those in the embodiment of FIGS. 15-19.

Further additional components may be included in other embodiments. In one embodiment, one or more additional components 83 may be modularly connectable to the carriage 32 and to each other to provide the desired functionality, as shown in FIG. 19. Removable connections such as fasteners, clamps, interlocking structures (e.g., tabs/slots), or other structures may be used to effect these modular connections. As illustrated in FIG. 19, each of the additional components 83 is connectable to the carriage 32 and connectable to the outer side of each other additional component 83 in order to provide a fully modular and customizable structure. Such additional components 83 may include one or more secondary exposure devices 80, squeegees 81, or vacuum squeegees 82 as described herein. Such additional components 83 may also include other functional components, such as a solvent or liquid washing apparatus, mechanical wipers/cleaners, a color applicator, or an apparatus for additional material deposition. A color applicator used in this configuration can allow coloring to be applied on a layer-by-layer basis, giving the final object 11 a coloring that penetrates internally through the thickness of the object 11, instead of simply a surface coating. An apparatus for additional material deposition may include an apparatus for deposition of conductive materials or traces within the body of the object 11, providing conductivity and/or circuit functionality to the object 11.

Figure 20A:
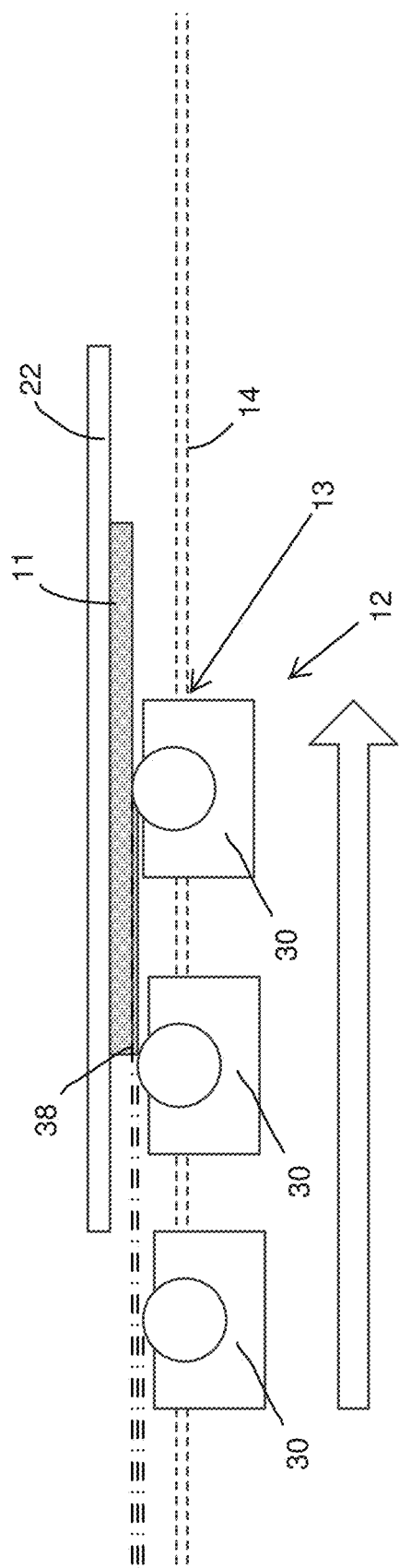
FIGS. 20A and 20B are side schematic views of another embodiment of an apparatus for producing a three-dimensional object in operation, according to aspects of the disclosure.
Figure 20B:
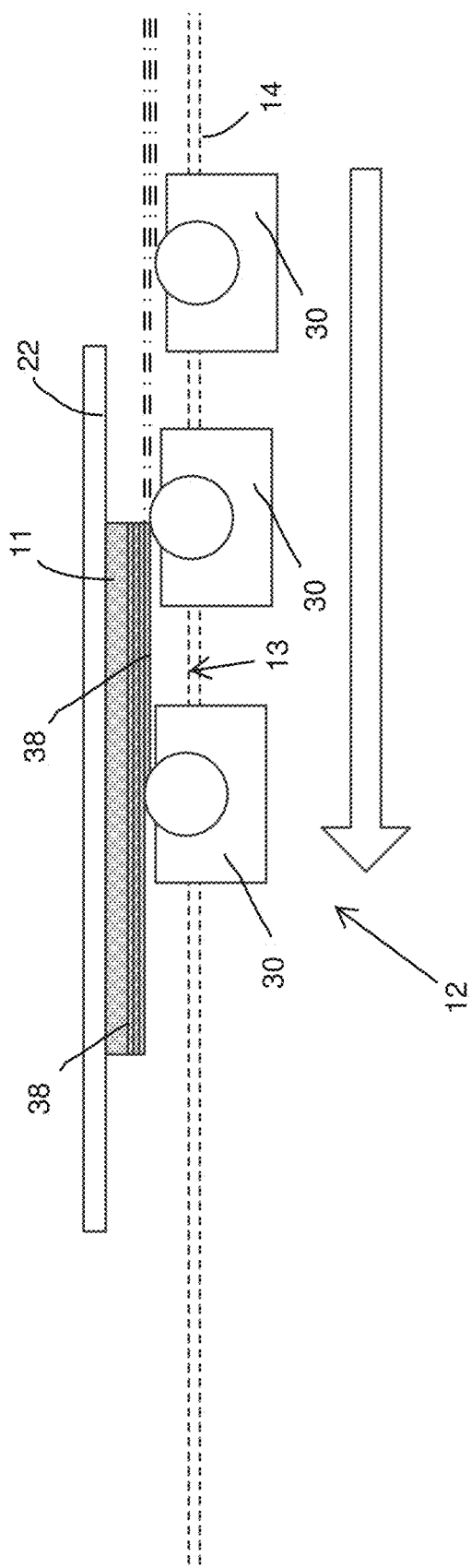
Figure 21:
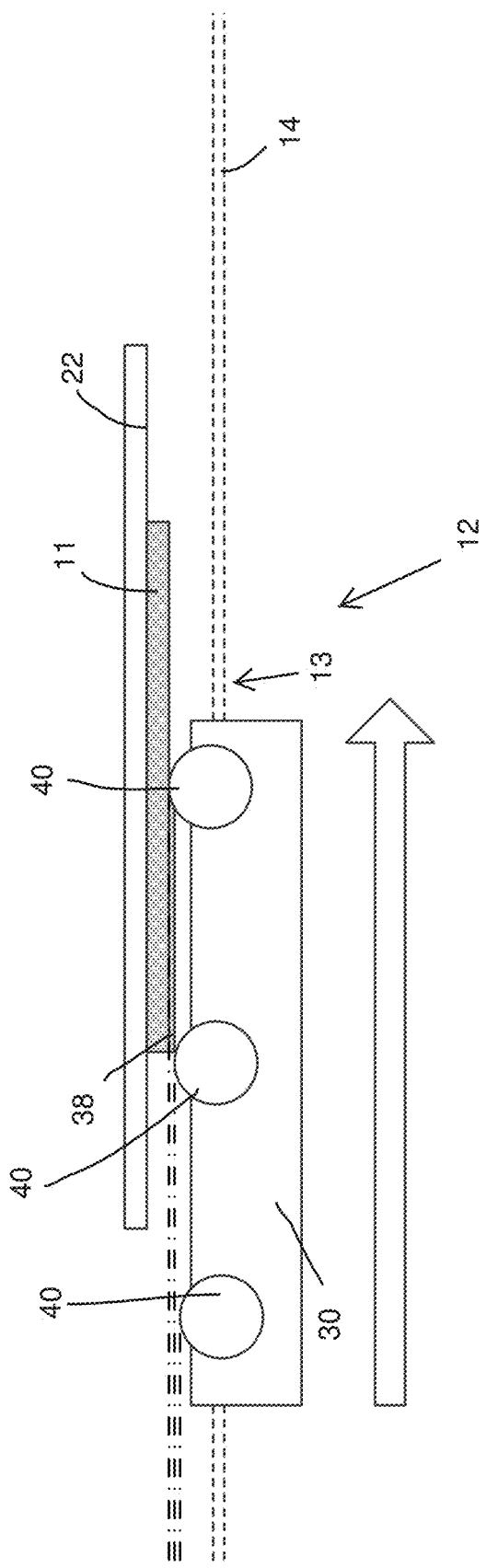
FIG. 21 is a side schematic view of another embodiment of an apparatus for producing a three-dimensional object in operation, according to aspects of the disclosure.
Figure 22:
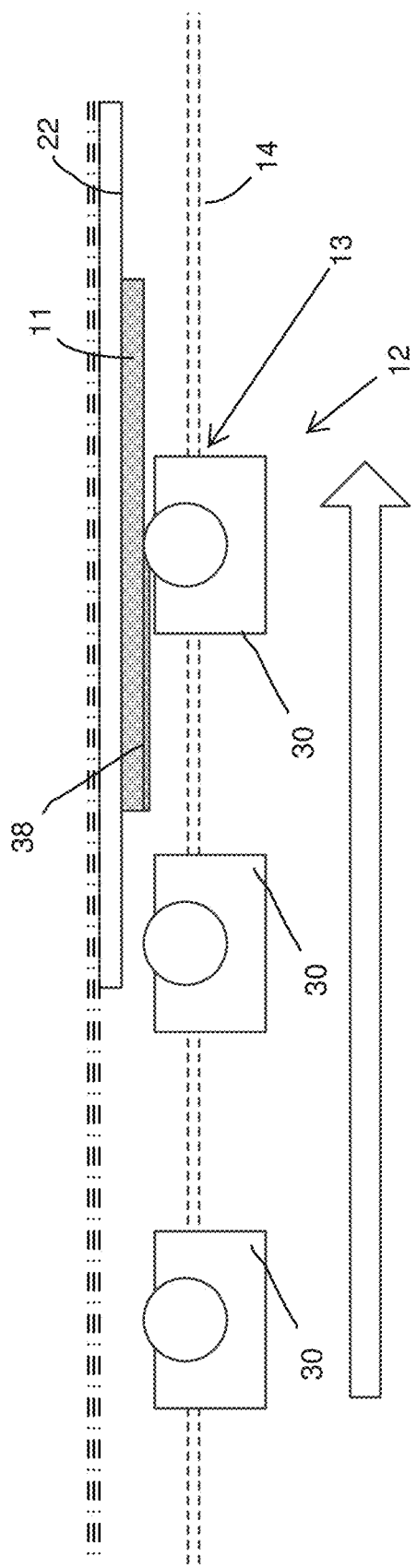
FIG. 22 is a side schematic view of another embodiment of an apparatus for producing a three-dimensional object in operation, according to aspects of the disclosure.
Figure 23:
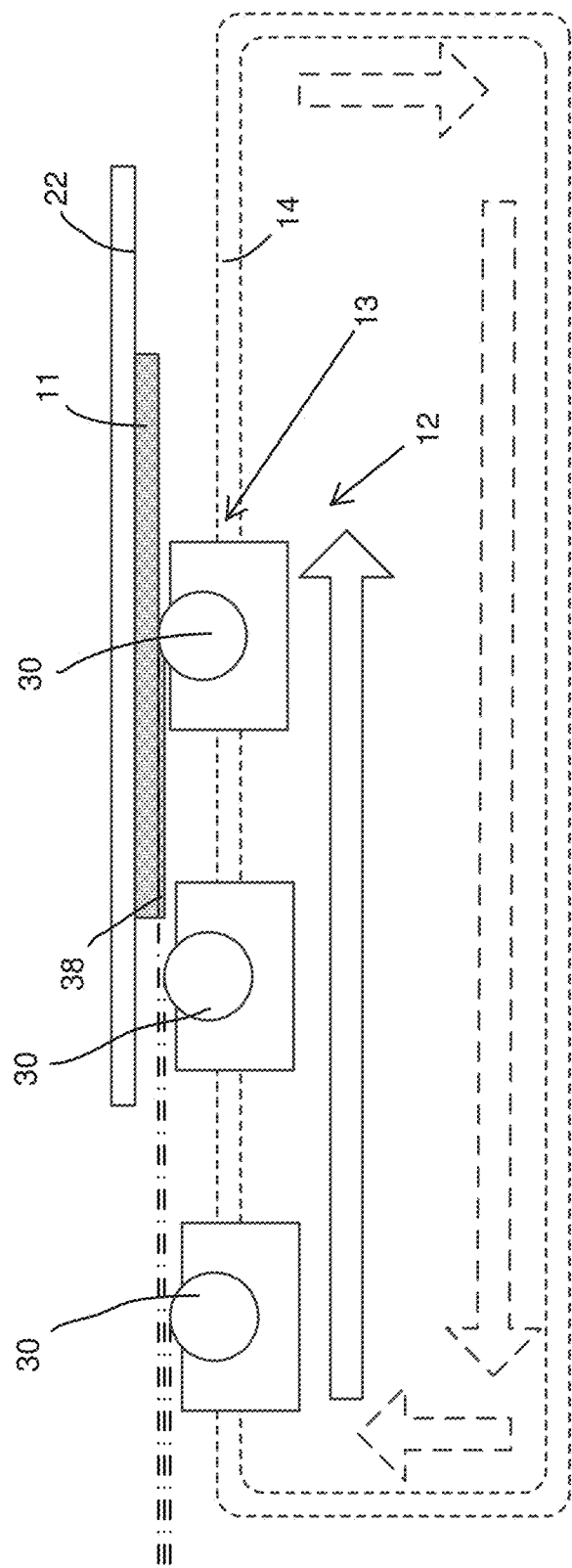
FIG. 23 is a side schematic view of another embodiment of an apparatus for producing a three-dimensional object in operation, according to aspects of the disclosure.

The apparatus 12 may be configured to use multiple deposition mechanisms 30 and/or multiple applicators 40 to pass through the build area 13 in sequence, such as illustrated in FIGS. 20-23. The multiple deposition mechanisms 30 in FIGS. 20-23 are illustrated as being connected to the same track 14, but multiple tracks 14 may be used in another embodiment. In one embodiment, as illustrated in FIGS. 20A-B, multiple deposition mechanisms 30 may be configured to pass through the build area 13 sequentially, with each deposition mechanism 30 having the applicator 40 at different vertical positions. The different applicator 40 positions are indicated by phantom lines in FIGS. 20A-B, and each successive deposition mechanism 30 is spaced lower than the preceding deposition mechanism 30. This configuration may be accomplished using vertical positioning structures described elsewhere herein. It is understood that the difference in vertical positioning among the multiple deposition mechanisms 30 may be substantially the same as the desired thickness of each applied layer 38. As shown in FIG. 20A, multiple deposition mechanisms 30 passing through the build area 13 each deposit a layer 38, one on top of the next, in a single pass that does not require re-positioning of the support assembly 20. This configuration results in multiplicative efficiency and time savings, as each pass in FIG. 20A deposits 3× as many layers as a single pass with a single deposition mechanism 30. Further, the multiple deposition mechanisms 30 may be configured to adjust their heights in the reverse order to enable a pass in the opposite direction to deposit three additional layers 38, after repositioning of the build platform 22, as shown in FIG. 20B. In another embodiment, the support assembly 20 may be configured for rapidly adjusting the positioning of the build platform 22 between each deposition mechanism 30 passing, to enable multiple passes, as shown in FIG. 22. In a further embodiment, the track 14 may be arranged in a loop or carousel configuration to enable passes by one or more deposition mechanisms 30 at the same relative build platform 22 height, without reversing the direction of the deposition mechanism(s) 30. This can remove the necessity for re-adjusting the relative heights of the deposition mechanisms 30 relative to each other, and only adjustment of the build platform 22 relative to the track 14 is necessary. This can also remove the need for duplicative components such as secondary exposure devices 80, squeegees 81, vacuum squeegees 82, etc., to permit opposite directional passes. The loop of the track 14 may be horizontal, vertical, or a more complex configuration. When multiple deposition mechanisms 30 are used, all deposition mechanisms 30 may use the same material 36, or different deposition mechanism 30 may be configured to apply different materials 36. Due to differences in properties of different materials 36, the deposition mechanism 30 may need to pass at different speeds. A self-propelled carriage 32 as described herein permits this operation. Still further, the track 14 may include a complex structure (not shown) with rest areas for unused deposition mechanisms and track-switching mechanisms, to permit switching between deposition mechanisms 30 as desired.

In another embodiment, multiple deposition mechanisms 30 may be configured as illustrated in FIGS. 20A-B to pass through the build area 13 sequentially, with the deposition mechanisms 30 having the applicators 40 at the same vertical positions. This can be used to build different portions of the same layer of an object 11, and in particular, the deposition mechanisms 30 can be configured to deposit different materials 36 in the layer. For example, different deposition mechanisms 30 can produce portions with different colors, or one deposition mechanisms 30 may produce the body of the object 11 while another produces the support structure to be later removed.

In another embodiment, shown in FIG. 21, a single deposition mechanism 30 may include multiple applicators 40 positioned at different heights to define separate application sites 41, with sufficient outlets 54 for the waves 53 emitted by one or more exposure devices 50 to define a separate exposure site 51 for each applicator 40. The multiple applicators 40 may be configured with a single supply 34 of the flowable material 36 or multiple supplies 34 of one or more flowable materials 36, and it is understood that other components may be duplicated if desired. The rollers 42 in FIG. 21 may be vertically adjustable relative to each other in one embodiment.

Figure 24A:
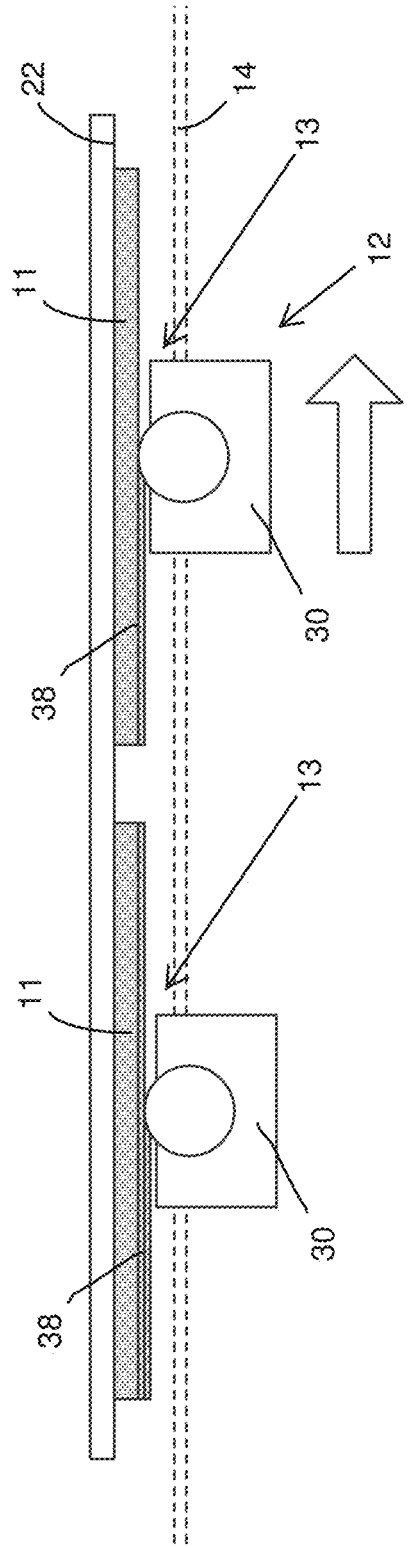
FIG. 24A is a side schematic view of another embodiment of an apparatus for producing a three-dimensional object in operation, according to aspects of the disclosure.
Figure 24B:
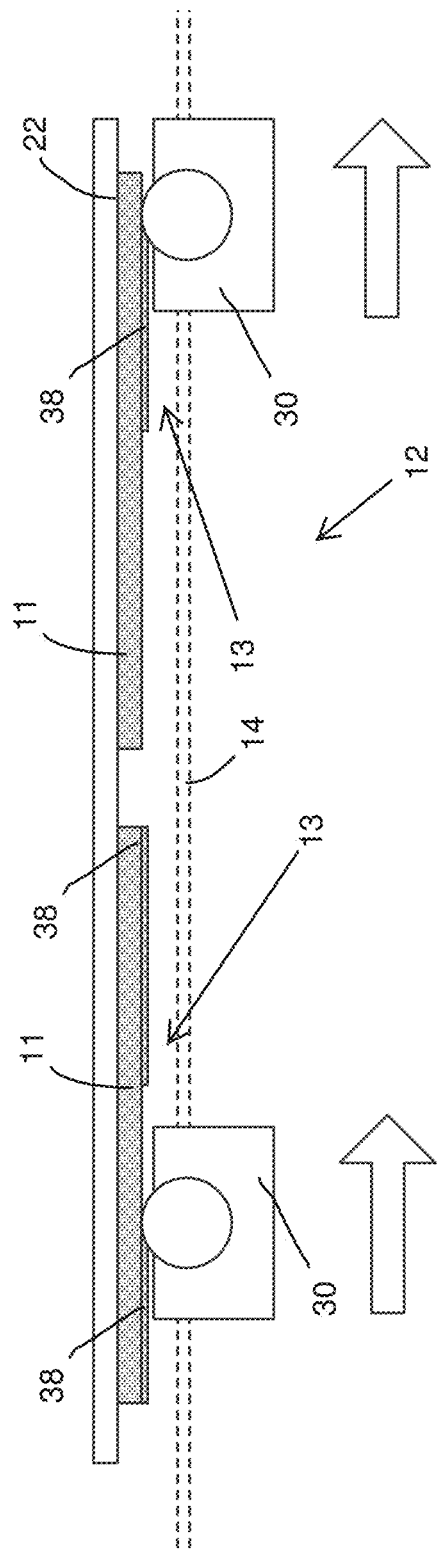
FIG. 24B is a side schematic view of another embodiment of an apparatus for producing a three-dimensional object in operation, according to aspects of the disclosure.
Figure 25:
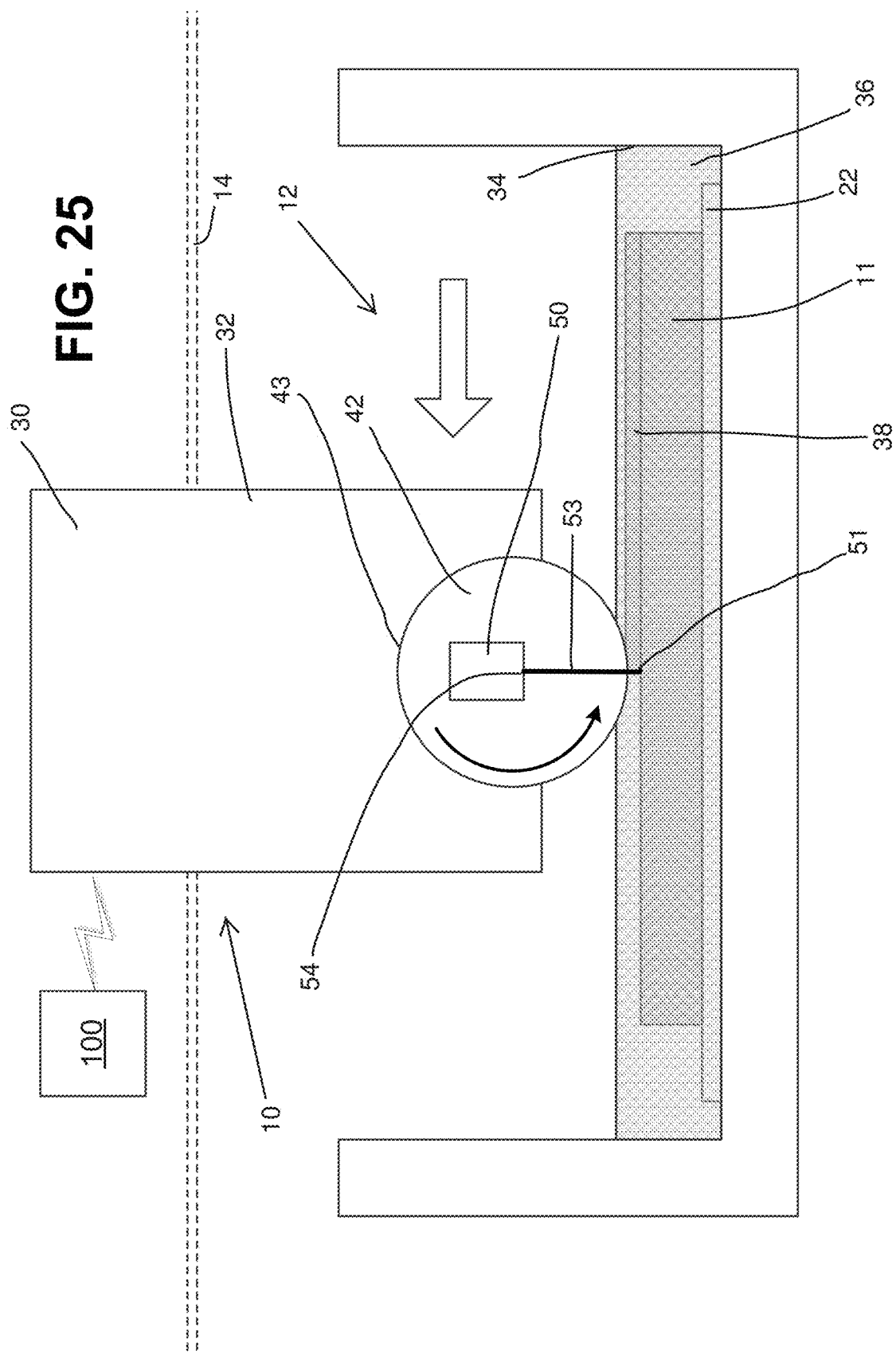
FIG. 25 is a side schematic view of another embodiment of a system and apparatus for producing a three-dimensional object in operation, according to aspects of the disclosure.

In other embodiments, shown in FIGS. 24A-B, a single or multiple deposition mechanisms 30 may be configured to build multiple objects 11 in a single pass, such as by using multiple build platforms 22 or multiple objects 11 built on the same build platform 22, with each separate object 11 having a separate build area 13 through which the track 14 passes. As shown in FIG. 24A, multiple deposition mechanisms 30 may apply multiple consecutive layers 38 to multiple objects 11 in a single pass. As shown in FIG. 24B, multiple deposition mechanisms 30 may apply different portions of the same layer 38 to each of multiple objects 11 in a single pass. This configuration may be particularly useful for a part where multiple materials need to be deposited in the same layer, such as for a multi-material object 11 or an object 11 that includes support structure being manufactured along with the object 11 that will be later removed. It is understood that the height(s) of the build platform(s) 22 relative to the applicator(s) 40 may be adjusted between passes as described herein. Additionally, the use of multiple deposition mechanisms 30 and/or multiple applicators 40 as shown in FIGS. 20-23 with an embodiment as shown in FIG. 24 may enable dually multiplicative efficiency and time savings. Further, the use of multiple deposition mechanisms 30 and/or multiple applicators 40 as shown in FIGS. 20-23 in combination with an embodiment as shown in FIG. 24A or 24B may enable different parts of multiple identical objects 11 to be simultaneously manufactured in a single pass of each deposition mechanism 30. For example, a first deposition mechanism 30 may be loaded with a first material 36 for manufacturing a first part of an object 11, and a second deposition mechanism 30 may be loaded with a second material 36 for manufacturing a second part of the object 11, and each of these deposition mechanisms 30 can be configured make a single pass depositing a layer 38 (or partial layer) of the desired material 36 in the same location on a plurality of identical objects 11 sequentially as shown in FIG. 24A-B. It is understood that different deposition mechanisms 30 may also include different exposure devices 50 if different materials 36 are used.

Figure 28:
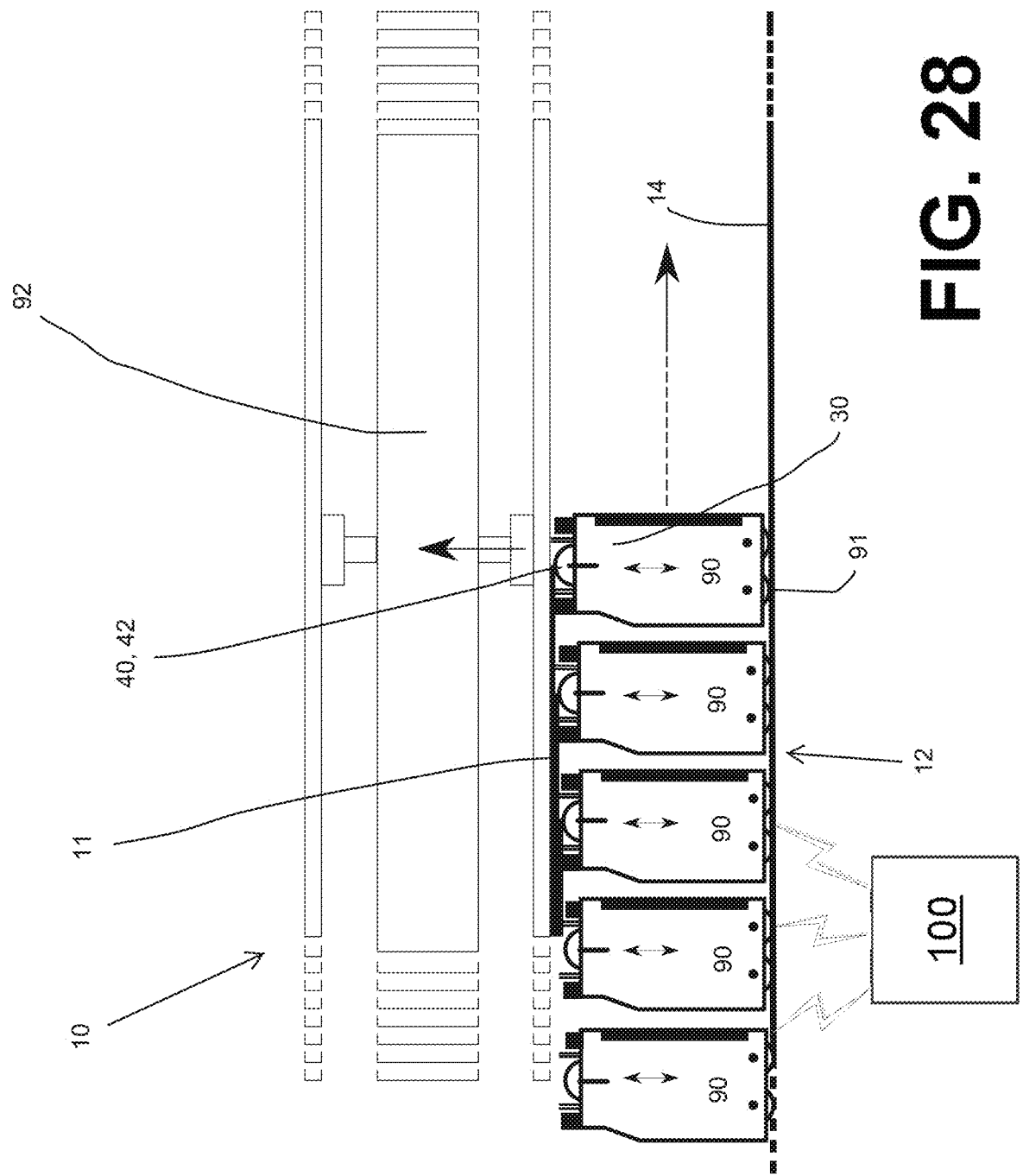
FIG. 28 is a side schematic view of another embodiment of a system and apparatus for producing a three-dimensional object in operation, according to aspects of the disclosure.

FIG. 28 illustrates an additional embodiment of a system 10 for manufacturing one or more objects 11 utilizing an apparatus 12 and deposition mechanisms 30 according to embodiments described herein. In particular, the embodiment of FIG. 28 may be configured for producing a number of objects 11 in sequence, similar to the embodiment of FIG. 24. Each deposition mechanism 30 in the embodiment of FIG. 28 may be configured as an autonomous unit 90 with an individual sub-controller, where all of the sub-controllers for all of the units 90 are integrated with the controller 100, such that the controller 100 controls the sub-controllers and thereby controls all of the units 90. Each unit 90 may further include a deposition mechanism 30 and a drive mechanism 91 configured for moving the unit 90 around during manufacturing. As shown in FIG. 28, the units 90 are all connected to a carousel 92 that moves the units 90 around to a plurality of stations. The stations may each be configured for a specialized purpose. For example, some stations may be manufacturing stations where the unit 90 makes a pass through one or more build areas 13 for manufacturing one or more objects 11 on one or more build platforms 22. Such stations may also include robotic components, such as robotic arms that hold a build platform 22 in the proper location for building by the units 90. Other stations may be maintenance stations, such as stations configured for refilling the supply 34 the unit 90. The carousel 92 may have one or more tracks 14 as described herein for guiding movement of the units 90 during building. The drive mechanism 91 may be multi-functional, such that the units 90 are autonomously powered and capable of engaging and disengaging from the track 14 and moving separately from the track 14 when not in the building process, such as for visiting refilling or maintenance stations. In the configuration illustrated in FIG. 28, each unit 90 may be loaded with a different material 36 for manufacturing different parts of a single object 11 or different objects, as described above with respect to FIG. 24. This configuration therefore provides the ability for rapid manufacturing of a series of objects 11, either identical objects 11 or different objects 11.

Figure 29:
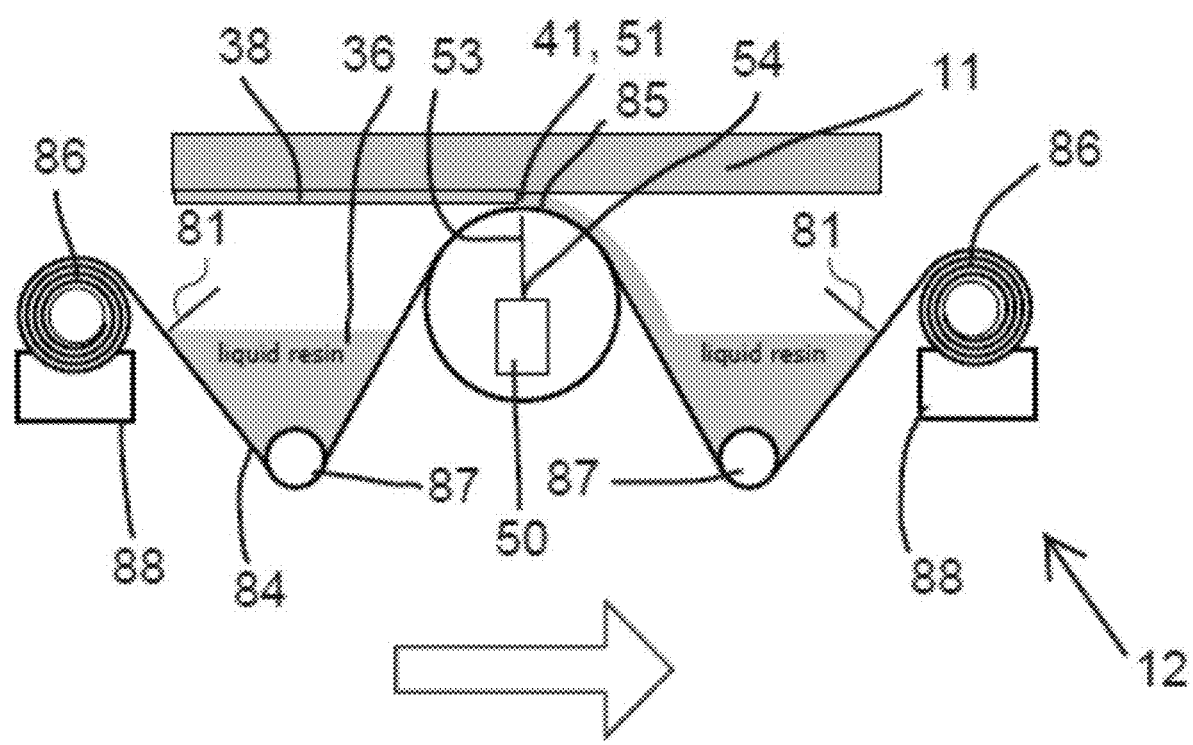
FIG. 29 is a side schematic view of another embodiment of an apparatus for producing a three-dimensional object in operation, according to aspects of the disclosure.

FIG. 29 illustrates an additional embodiment of a system 10 for manufacturing one or more objects 11 utilizing an apparatus 12 and a deposition mechanism 30 with an applicator 40 that is different from the roller 42 described herein.

In the embodiment of FIG. 29, the applicator 40 includes a movable film 84 that is in communication with the supply 34 of the flowable material 36 and carries the flowable material 36 to the application site 41 by lateral movement to form a layer 38 of the object 11. The deposition mechanism 30 in FIG. 29 has a static surface 85 that defines the location of the application site 41 and the thickness of the applied layer 38 as described above, and the film 84 carries the material 36 to the application site 41 by moving over the static surface 85. The static surface 85 is formed by a cylinder in FIG. 29, but may be formed by a ridge or other structure in other embodiments. The deposition mechanism in FIG. 29 also has two rolls 86 on opposite sides of the application site 41, which serve as take-up or supply stations, depending on the direction of movement. For example, in FIG. 29, the deposition mechanism is moving from left to right as indicated, and the film 84 is moving from right to left, with the left hand roll 86 serving as a take-up station and the right-hand roll 86 serving as the supply station. This will be reversed when moving from right to left. Other components are also included such as guide rollers 87 or other guides for the film 84, squeegees 81 or other material removal devices to remove the flowable material 36 from the film 84 before reaching a take-up roller 86, and a cleaning station 88 for cleaning the film 84 stored on the rolls 86. While the carriage 32 is not shown in FIG. 29, it is understood that all of these components may be mounted on a carriage 32 as described herein. As shown in FIG. 29, the exposure device 50, or at least the outlets 54 thereof, may be located beneath the static surface 85 and within the cylinder that defines the static surface 85, although any configuration and positioning of the exposure device 50 and the outlets 54 thereof described herein can be used in connection with this embodiment. In the illustrated configuration, the waves 53 from the exposure device 50 pass through both the static surface 85 and the film 84 on the path to the exposure site 51. In an additional embodiment, the static surface 85 may have a gap that permits the waves 53 to pass to the exposure site 51 without passing through the static surface 85. In a further embodiment, the static surface 85 may have an array 55 of outlets 54 mounted within such a gap, which may place the outlets 54 in such close proximity to the exposure site 51 that no lenses or other focusing equipment may be necessary.

FIG. 25 illustrates an alternate embodiment of the system 10 and apparatus 12 that uses a traditional vat supply 34 of the flowable material 36, with the deposition mechanism 30 positioned above the build platform 22. The deposition mechanism 30 in this embodiment generally includes a carriage 32 that is configured for movement along a track 14, with a roller 42 and an exposure device 50 that emits waves 53 that pass through the roller 42 on their path to the exposure site 51. In this embodiment, the roller 42 does not act as an applicator as in the embodiments of FIGS. 1 and 3-4, but does define the thickness of the applied layer 38 of the material 36, similarly to the such previous embodiments. As such, the roller 42 in this embodiment acts as a layer-defining mechanism, and differently configured structures may be used for this purpose in other embodiments, such as a block shape that slides along or through the material 36. The build platform 22 in FIG. 25 and associated structures may be configured to have a removable structure as described elsewhere herein. Additionally, the deposition mechanism 30 and/or the build platform 22 may have adjustment mechanisms (not shown) for relative vertical positional adjustment of the build platform 22 and the roller surface 42. The adjustment mechanism may include structures described herein and/or structures used in existing vat-based rapid prototyping technologies, such as moving the build platform 22 gradually deeper into the vat supply 34. This embodiment enables the object 11 to be manufactured below the surface of the flowable material 36 if so desired, with a controllable layer 38 thickness. However, this embodiment does not provide some of the advantages of the other embodiments described herein, such as eliminating the requirement to maintain a large vat supply 34 of the flowable material 36. It is understood that the embodiment of FIG. 25 may include additional structure, components, and features described herein. For example, the system 10 illustrated in FIG. 25 also includes a controller 100 configured for controlling and/or monitoring components of the apparatus 12 as described herein. As another example, the exposure device 50, or at least the outlets 54 thereof, are illustrated in FIG. 25 as being located inside the roller 42, but the exposure device 50 may be configured similar to that in FIG. 3 to project completely through the roller 42 in another embodiment.

In a further embodiment, an apparatus 12 as described herein may be enclosed within a sealed chamber that may be temperature controlled, pressure-controlled, humidity-controlled, and/or filled with a specific gas (including mixtures of gases). Temperature, pressure, and humidity control may be able to influence build speed and thereby improve efficiency. Additionally, the apparatus 12 has the ability to build hollow, sealed objects 11, and thus, selection of the environmental gas may permit production of a hollow, sealed object 11 filled with a specified gas. For example, such an object 11 filled with an inert gas may be useful, e.g., for aerospace applications.

The system 10 also includes a controller 100 that is configured to control and/or monitor the operation of one or more mechanisms of the apparatus 12, including numerous examples described herein. In one embodiment of the invention, controller 100 may be implemented with a computer system, such as computer 2602. Computer 2602 includes a central processor 2604 that controls the overall operation of the computer and a system bus 2606 that connects central processor 210 to the components described below. System bus 2606 may be implemented with any one of a variety of conventional bus architectures.

Computer 2602 may include a variety of interface units and drives for reading and writing data or files. For example, computer 2602 may include a memory interface 2608 coupling a memory drive 2610 to system bus 2606. Memory drive 2610 may be implemented with physical memory device, magnetic memory device, optical memory device or other type of memory device. Memory drive 2610 may store data, CAD files, and other electronic files that are used to produce three-dimensional objects as described herein. A system memory 2612 may be included and implemented with a conventional computer readable medium memory having a read only memory section that stores a basic input/output system (BIOS) and a random access memory (RAM) that stores other data and files. Memory drive 2610 and system memory 2612 may both contain computer-executable instructions designed to be executed by processor 2604. In some embodiments, one or more control programs for operating one or more apparatuses 12 and/or multiple components (e.g., multiple deposition mechanisms 30) within each apparatus 12 may be stored in memory drive 2610 and/or system memory 2612.

Figure 26:
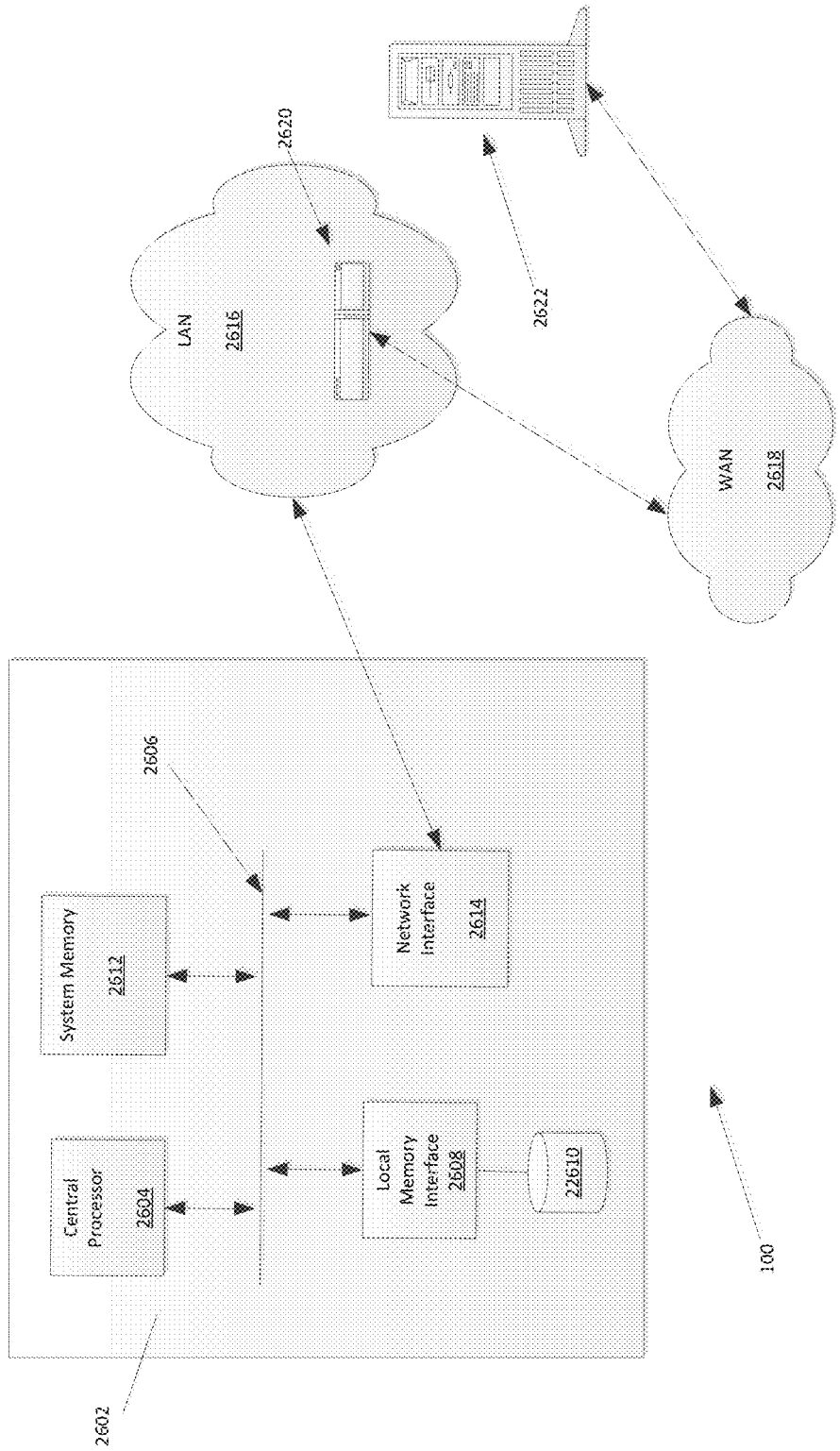
FIG. 26 is a schematic view of a controller according to aspects of the disclosure.

Computer 2602 may include additional interfaces for connecting peripheral devices to system bus 2606. For example, computer 2602 may also include a network interface 2614 that couples system bus 2602 to local area network (LAN) 2616. LAN 2616 may have one or more of the well-known LAN topologies and may use a variety of different protocols, such as Ethernet. A wide area network (WAN) 2618, such as the Internet, may also be accessed by computer 2602. FIG. 26 shows a router 2620 that may connect LAN 2616 to WAN 2618 in a conventional manner. A server 2622 is shown connected to WAN 204. Of course, numerous additional servers, computers, handheld devices, personal digital assistants, telephones and other devices may also be connected to WAN 2618. In some embodiments, server 2622 stores data, CAD files, control programs and/or other electronic files that may be accessed by computer 2602 and used to produce three-dimensional objects as described herein.

Various embodiments are described herein with various combinations of features and components. It is understood that the features and components of each of the various embodiments described herein may be incorporated into other embodiments described herein.

The use of the system and apparatus described herein provides benefits and advantages over existing technology. For example, consumable cost is greatly decreased, as the apparatus generates little waste and does not require maintaining a large vat of material to be solidified for manufacturing, as do many current technologies. Additionally, the structure of the apparatus does not dictate any specific size limits, and the apparatus may be configured to create an object that is significantly larger than existing technologies. The length of the track and the width of the applicator can be increased as desired without negatively affecting performance, and the size of the room in which the apparatus sits becomes the limit of the size of the apparatus. Further, the apparatus may be configured for manufacturing an object or multiple objects many times faster than any existing technology. The apparatus also provides the ability to manufacture objects from multiple materials, including objects that have removable support structure that is made from a material different from that of the main object. Production of objects from multiple materials that require different exposure sources is enabled as well. The apparatus further provides the ability to manufacture functional objects, such as a window or other transparent object, or a conductive object. Still further, objects manufactured using the apparatus described herein may not require draining liquid material from any internal cavities of the finished object, which may require drilling a hole for drainage. The apparatus is also capable of producing clean, dry, and fully-cured objects, which increases production efficiency. The modular configuration of the apparatus also great versatility, customizability, and other benefits. Still other benefits and advantages over existing technology are provided by the systems, apparatuses, and methods described herein, and those skilled in the art will recognize such benefits and advantages.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. In particular, these terms do not imply any order or position of the components modified by such terms. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention.

What is claimed is:

1. An apparatus comprising:
a build surface configured to support a three-dimensional object during building of the three-dimensional object using a first polymer material, wherein the build surface is provided by a flexible component;
a first supply of the first polymer material;
a first roller in communication with the first supply of the first polymer material such that the first polymer material is configured to be applied to an outer surface of the first roller, wherein the first roller is rotatable relative to the build surface and is configured for rotating to carry the first polymer material to the build surface for application to produce the three-dimensional object on the build surface using a layer-by-layer technique, such that first roller is configured to apply the first polymer material as a build material for building a permanent portion of the three-dimensional object;
wherein the apparatus is configured to produce relative linear movement of the first roller with respect to the build surface to apply the first polymer material to different locations on the build surface, and wherein the first roller is configured for rotating such that the outer surface of the first roller at a point most proximate to the build surface travels in a same direction as a direction of relative linear movement of the build surface with respect to an axis of rotation of the first roller;
a second supply of a second polymer material,
a second roller in communication with the second supply of the second polymer material such that the second polymer material is configured to be applied to an outer surface of the second roller, wherein the second roller is rotatable relative to the build surface and is configured for rotating to carry the second polymer material to the build surface for application to produce the three-dimensional object on the build surface using the layer-by-layer technique in conjunction with the first roller and the first polymer material, such that the first roller and the second roller are configured to pass the build surface consecutively and linearly and are spaced such that the first roller and the second roller are configured to apply the first polymer material and the second polymer material to the build surface simultaneously,
wherein the apparatus is configured to produce relative linear movement of the second roller with respect to the build surface to apply the second polymer material to different locations on the build surface, and wherein the second roller is configured for rotating such that the outer surface of the second roller at a second point most proximate to the build surface travels in a same direction as a direction of relative linear movement of the build surface with respect to an axis of rotation of the second roller, such that second roller is configured to apply the second polymer material as a support material for building a removable support portion of the three-dimensional object; and a vertical adjustment mechanism configured for adjusting a distance from the build surface to the first roller and the second roller, such that the first roller and the second roller are configured to pass the build surface consecutively and linearly at the same distance from the build surface.

2. The apparatus of claim 1, wherein:
the second polymer material is different from the first polymer material.

3. The apparatus of claim 1, wherein the support material is a chemical-soluble or water-soluble material.

4. The apparatus of claim 1, wherein the apparatus is configured to produce the relative linear movement of the first roller and the second roller with respect to the build surface in either direction along a linear travel path.

5. The apparatus of claim 1, wherein the first roller and the second roller are configured for rotating in a same direction during application of the first polymer material and the second polymer material, respectively.

6. The apparatus of claim 1, wherein the first polymer material and the second polymer material include photocurable liquid resins, and application to produce the three-dimensional object includes polymerization of the liquid resins.

7. The apparatus of claim 1, wherein the first polymer material has at least one property that is different from the second polymer material.

8. The apparatus of claim 1, wherein the second roller is positioned and configured to apply the second polymer material to the build surface subsequent to the application of the first polymer material by the first roller.

9. The apparatus of claim 1, wherein the first polymer material includes a first particulate material, and the second polymer material includes a second particulate material.

10. The apparatus of claim 9, wherein the first particulate material has at least one property that is different from the second particulate material.

11. An apparatus comprising:
a build surface configured to support a three-dimensional object during building of the three-dimensional object using a first polymer material, wherein the build surface is provided by a flexible component;
a first supply of the first polymer material;
a first roller in communication with the first supply of the first polymer material such that the first polymer material is configured to be applied to an outer surface of the first roller, wherein the first roller is rotatable relative to the build surface and is configured for rotating to carry the first polymer material to the build surface for application to produce the three-dimensional object on the build surface using a layer-by-layer technique,
wherein the apparatus is configured to produce relative linear movement of the first roller with respect to the build surface to apply the first polymer material to different locations on the build surface, and wherein the first roller is configured for rotating such that the outer surface of the first roller at a point most proximate to the build surface travels in a same direction as a direction of relative linear movement of the build surface with respect to an axis of rotation of the first roller, such that first roller is configured to apply the first polymer material as a build material for building a permanent portion of the three-dimensional object;

a second supply of a second polymer material;
a second roller in communication with the second supply of the second polymer material such that the second polymer material is configured to be applied to an outer surface of the second roller, wherein the second roller is rotatable relative to the build surface and is configured for rotating to carry the second polymer material to the build surface for application to produce the three-dimensional object on the build surface using the layer-by-layer technique in conjunction with the first roller and the first polymer material, such that the first roller and the second roller are configured to pass the build surface consecutively and linearly and are spaced such that the first roller and the second roller are configured to apply the first polymer material and the second polymer material to the build surface simultaneously, wherein the apparatus is configured to produce relative linear movement of the second roller with respect to the build surface to apply the second polymer material to different locations on the build surfaces, and wherein the second roller is configured for rotating such that the outer surface of the second roller at a second point most proximate to the build surface travels in a same direction as a direction of relative linear movement of the build surface with respect to an axis of rotation of the second roller, such that second roller is configured to apply the second polymer material as a support material for building a removable support portion of the three-dimensional object;

a vertical adjustment mechanism configured for adjusting a distance from the build surface to the first roller and the second roller, such that the first roller and the second roller are configured to pass the build surface consecutively and linearly at the same distance from the build surface; and an exposure device configured for emitting electromagnetic waves toward an exposure site within a build area to solidify the first polymer material and the second polymer material applied by the first roller and the second roller to produce the three-dimensional object.

12. The apparatus of claim 11, wherein the first roller is permeable to the electromagnetic waves, and the exposure device has an outlet configured for emitting the electromagnetic waves toward the exposure site, wherein the outlet is positioned such that the electromagnetic waves pass through the first roller in traveling from the outlet to the exposure site.

13. The apparatus of claim 11, wherein the exposure device has an outlet configured for emitting the electromagnetic waves toward the exposure site, and the apparatus further comprises a lens array positioned between the outlet of the exposure device and the exposure site, wherein the lens array is configured to focus the electromagnetic waves exiting the outlet toward the exposure site.

14. The apparatus of claim 11, wherein the apparatus further comprises a plurality of optical fibers having exit ends arranged in an array, wherein the optical fibers are arranged such that the electromagnetic waves emitted by the exposure device travel through the optical fibers and exit the exit ends of the optical fibers directed toward the exposure site.

15. The apparatus of claim 11, wherein the first supply of the first polymer material comprises a vat located below the first roller, and the first roller is positioned such that the build surface is located above the first roller.

16. The apparatus of claim 11, wherein the exposure device is configured for emitting the electromagnetic waves toward the exposure site to solidify the first polymer material and the second polymer material simultaneously to produce the three-dimensional object.

17. The apparatus of claim 11, wherein the first polymer material includes a first particulate material, and the second polymer material includes a second particulate material.

18. The apparatus of claim 11, wherein the support material is a chemical-soluble or water-soluble material.

19. The apparatus of claim 11, wherein the apparatus is configured to produce the relative linear movement of the first roller and the second roller with respect to the build surface in either direction along a linear travel path.

20. The apparatus of claim 11, wherein the first roller and the second roller are configured for rotating in a same direction during application of the first polymer material and the second polymer material, respectively.

21. The apparatus of claim 11, wherein the first polymer material and the second polymer material include photocurable liquid resins, and application to produce the three-dimensional object includes polymerization of the liquid resins.

22. The apparatus of claim 11, wherein the first polymer material has at least one property that is different from the second polymer material.

23. The apparatus of claim 11, wherein the second roller is positioned and configured to apply the second polymer material to the build surface subsequent to the application of the first polymer material by the first roller.

* * * * *